US010978948B2

(12) United States Patent
Du et al.

(10) Patent No.: US 10,978,948 B2
(45) Date of Patent: Apr. 13, 2021

(54) INTERLEAVED MULTI-CHANNEL, MULTI-LEVEL, MULTI-QUADRANT DC-DC CONVERTERS

(71) Applicant: ABB Inc., Raleigh, NC (US)

(72) Inventors: Yu Du, Raleigh, NC (US); Eddy Aeloiza, Apex, NC (US); Rolando Burgos, Blacksburg, VA (US)

(73) Assignee: ABB Schweiz AG, Baden (CH)

( * ) Notice: Subject to any disclaimer, the term of this patent is extended or adjusted under 35 U.S.C. 154(b) by 44 days.

(21) Appl. No.: 15/211,888

(22) Filed: Jul. 15, 2016

(65) Prior Publication Data

US 2016/0329811 A1   Nov. 10, 2016

Related U.S. Application Data

(63) Continuation of application No. PCT/US2014/065702, filed on Nov. 14, 2014.
(Continued)

(51) Int. Cl.
*H02M 3/158* (2006.01)
*H02M 1/14* (2006.01)
(Continued)

(52) U.S. Cl.
CPC ............. *H02M 3/158* (2013.01); *H02M 1/08* (2013.01); *H02M 1/14* (2013.01); *H02M 3/1584* (2013.01);
(Continued)

(58) Field of Classification Search
CPC .. H02M 3/1584; H02M 3/1588; H02M 3/158; H02M 1/08; H02M 1/14;
(Continued)

(56) References Cited

U.S. PATENT DOCUMENTS 4,384,321 A    5/1983  Rippel
5,784,269 A *  7/1998  Jacobs ............... H02M 1/4216
                                                    363/89
(Continued)

FOREIGN PATENT DOCUMENTS

EP          2677650         12/2013

OTHER PUBLICATIONS

Berbel et al., "Feedback linearization control with average current sharing for multiphase synchronous buck converter," European Conference on Power Electronics and Applications, IEEE, Sep. 2005, pp. 11-14. (Year: 2005).*
(Continued)

*Primary Examiner* — Shawki S Ismail
*Assistant Examiner* — Monica Mata
(74) *Attorney, Agent, or Firm* — Taft Stettinius & Hollister LLP

(57) ABSTRACT

Direct-current-to-direct-current (DC-DC) power converters that include two or more multi-quadrant, multi-level, DC-DC, switching converter subcircuits, connected in parallel at respective input and output sides, so as to provide a multi-channel, multi-quadrant, multi-level configuration, are disclosed. The DC-DC power converters further include a control circuit configured to control the switching converter subcircuits so that corresponding switching semiconductors in each of the switching converter subcircuits are switched in an interleaved manner. In some embodiments, each of the switching converter subcircuits is a three-level, neutral-point-clamped, four-quadrant DC-DC converter circuit. In other embodiments, each of the switching converter subcircuits is a three-level, neutral-point-clamped, two-quadrant DC-DC converter circuit. In any of these embodiments, a filter capacitor may be connected between across a pair of
(Continued)

output terminals at the output sides of the switching converter subcircuits.

19 Claims, 23 Drawing Sheets

Related U.S. Application Data

(60) Provisional application No. 61/927,776, filed on Jan. 15, 2014.

(51) Int. Cl.
  *H02M 1/08* (2006.01)
  *H02M 7/487* (2007.01)
  *H02M 1/00* (2006.01)

(52) U.S. Cl.
  CPC .... *H02M 7/487* (2013.01); *H02M 2001/0009* (2013.01); *H02M 2001/0064* (2013.01); *H02M 2001/0074* (2013.01); *H02M 2003/1586* (2013.01)

(58) Field of Classification Search
  CPC ......... H02M 7/487; H02M 2001/0009; H02M 2001/0064; H02M 2001/0074; H02M 2003/1586; H02J 1/102; Y02B 70/1466
  USPC ........................................................ 323/272
  See application file for complete search history.

(56) References Cited

U.S. PATENT DOCUMENTS

| | | | |
|---|---|---|---|
| 6,545,450 B1* | 4/2003 | Ledenev | G06F 1/26 323/272 |
| 2008/0304300 A1* | 12/2008 | Raju | H02M 7/217 363/126 |
| 2009/0196764 A1* | 8/2009 | Fogarty | H02P 27/14 417/44.1 |
| 2011/0187369 A1 | 8/2011 | Rivas | |
| 2013/0003424 A1 | 1/2013 | Song | |
| 2013/0099767 A1* | 4/2013 | Huang | H04B 10/504 323/311 |
| 2016/0211749 A1* | 7/2016 | Okada | H02M 7/487 |

OTHER PUBLICATIONS

PCT Search Report and Written Opinion; European Patent Office; PCT Patent Application No. PCT/US2015/063736 dated Mar. 18, 2016, 5 pages.

\* cited by examiner

INTERLEAVED MULTI-CHANNEL, MULTI-LEVEL, MULTI-QUADRANT DC-DC CONVERTERS

U.S. GOVERNMENT RIGHTS

This invention was made with Government support under ARPA-E Cooperative Agreement DE-AR0000141 awarded by the Department of Energy (DOE). The Government has certain rights in this invention.

TECHNICAL FIELD

The present disclosure relates to DC-to-DC converters for use in electric distribution systems.

BACKGROUND

In the electric power industry, direct-current (DC) distribution systems, DC energy sources such as photovoltaic (PV) panels and fuel cells, and DC-based energy storage systems are of increasing systems. In each of these technology areas, improved DC-DC converters, with the capability to handle high voltages and high currents are needed.

SUMMARY

Embodiments of the present invention are based on the parallel connection and interleaving of multiple multi-level, multi-quadrant, DC-DC converters. Because these converter systems can provide bidirectional current flow and/or bipolar output voltages, they can be used to couple a DC grid or an AC-DC converter output to a wide range of DC loads and energy sources, such as passive loads in a DC distribution system, DC energy sources such as photovoltaic (PV) panels and fuel cells, DC energy storage systems such as batteries and super capacitors with two-quadrant current flow, superconducting magnetic energy storage (SEMS) coils with two-quadrant voltage polarity, and active loads such as DC motors with four-quadrant operation.

Example embodiments of the present invention include a direct-current-to-direct-current (DC-DC) power converter that includes two or more multi-quadrant, multi-level, DC-DC, switching converter subcircuits, connected in parallel at respective input and output sides, so as to provide a multi-channel, multi-quadrant, multi-level configuration. The DC-DC power converter further includes a control circuit configured to control the switching converter subcircuits so that corresponding switching semiconductors in each of the switching converter subcircuits are switched in an interleaved manner.

In some embodiments, each of the switching converter subcircuits includes a switching assembly having a first side and a second side, the first side having three or more terminals configured for connecting to a multi-level DC interface and the second side having a pair of terminals configured for coupling to a two-level DC interface, as well as an inductor assembly including first and second inductors and connected to the switching assembly so that that each terminal on the second side of the switching is connected to a corresponding first end of a different one of the first and second inductors.

In some embodiments, each of the switching converter subcircuits is a three-level, neutral-point-clamped, four-quadrant DC-DC converter circuit. In other embodiments, each of the switching converter subcircuits is a three-level, neutral-point-clamped, two-quadrant DC-DC converter circuit. In any of these embodiments, a filter capacitor may be connected between across a pair of output terminals at the output sides of the switching converter subcircuits.

In several embodiments, each of the switching converter subcircuits includes a switching assembly having a first side and a second side, the first side having three or more terminals configured for connecting to a multi-level DC interface and the second side having first and second terminals configured for coupling to a two-level DC interface, as well as a coupled inductor pair, comprising first and second inductors, each having a first and second end, where the first end of the first inductor is connected to the first terminal of the switching assembly and the first end of the second inductor is connected to the second terminal of the switching assembly. In some of these embodiments, the coupled inductor pair in each switching converter subcircuit has a coupling coefficient of about 0.5. In some of these embodiments, the coupled inductor pair can be implemented by two un-coupled inductors in series to a transformer with two well-coupled windings. In some of these embodiments, all the inductors can be coupled to a common core structure instead of coupled pairs.

Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

DC-DC converters with the capability to handle high voltage and high currents are needed for such applications as coupling a DC grid or an AC-DC converter output to any of a wide range of DC loads and energy sources, such as a passive load in a DC distribution system, a DC energy source such as a photovoltaic (PV) panel or fuel cell array, a DC energy storage device such as batteries and super capacitors with two-quadrant current flow, superconducting magnetic energy storage (SEMS) coils with two-quadrant voltage polarity, and an active load such as DC motors with four-quadrant operation. As discussed in further detail below, previously used circuits do not provide the combination of high-voltage handling, high-current handling, and multi-quadrant operation that are required to satisfy this wide variety of applications.

Embodiments of the present invention are based on the parallel connection and interleaving of multiple multi-level, multi-quadrant, DC-DC converters. Because these converter systems can provide bidirectional current flow and/or bipolar output voltages, the same circuit configuration can be used to couple a DC grid or a DC rectifier output to any of the loads or energy sources mentioned above.

The DC-DC converters described in detail below combine multi-level, multi-quadrant converter subcircuits, in an interleaved fashion, to provide high-efficiency, high-power conversion systems while maintaining relatively low levels of voltage and current stresses on individual switching devices. The interleaving of these subcircuits reduces the magnitude of current ripple in DC-link capacitors and increases the effective switching frequency of the converter system, so that output voltage and/or current ripples, as well as capacitor sizes and costs, are reduced. The design of the converter systems is modular, allowing for easy scalability of the converters and the reduction of manufacturing and maintenance costs.

Figure 1:
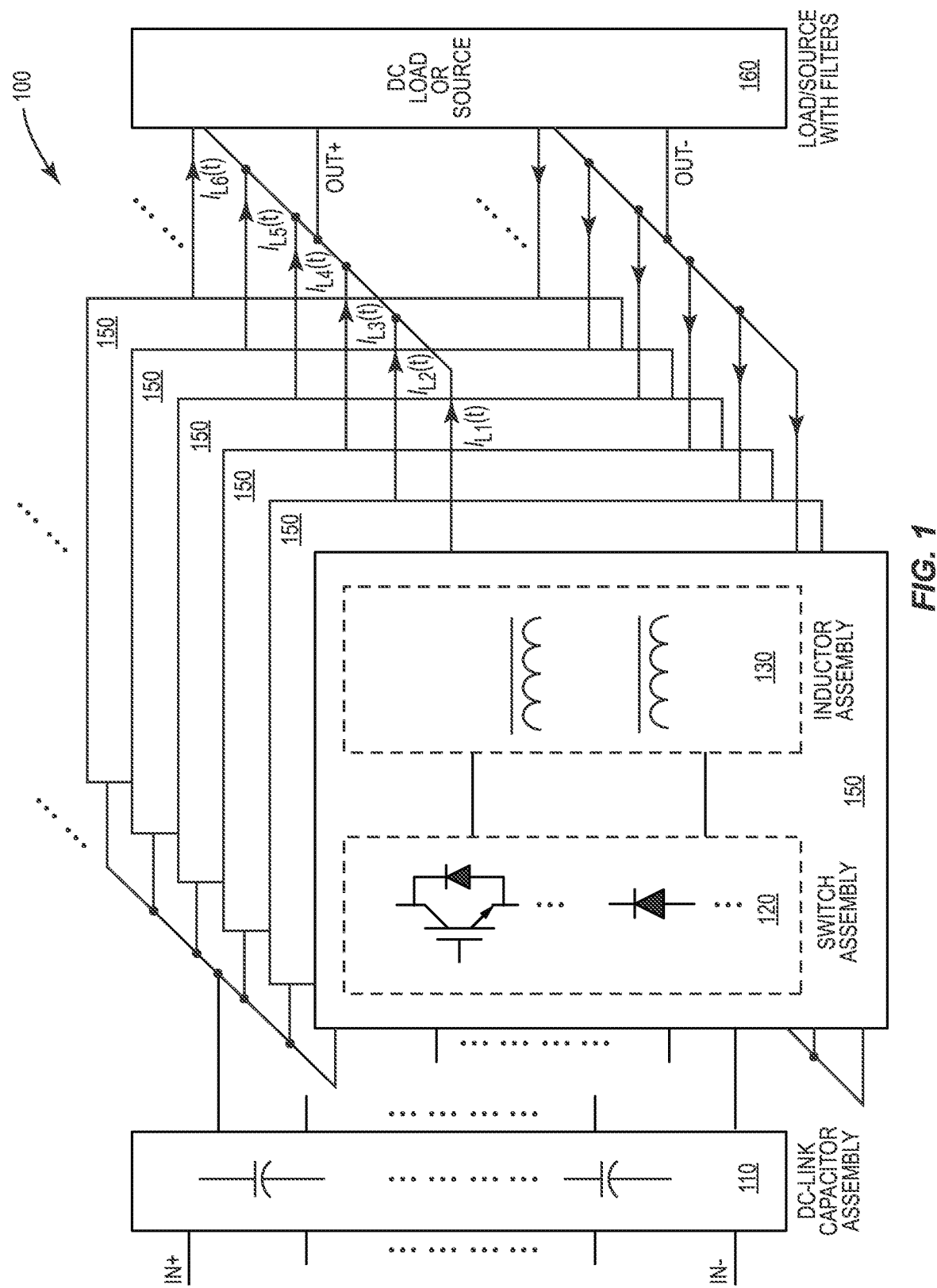
FIG. 1 is a schematic diagram illustrating an example interleaved, multi-channel, multi-level, multi-quadrant, DC-DC converter, according to some embodiments of the present invention.

An example power converter 100 according to this approach is pictured in FIG. 1, and includes a DC-link multi-level capacitor assembly 110, a multi-level, multi-quadrant, switch assembly 120 in each of several converter subcircuits 150, or "channels," and an inductor assembly 130 in each converter subcircuit 150. The converter subcircuits are connected in parallel between the multi-level capacitor assembly 110 and a load or source with filter 160. Each switch assembly 120 is configured in a multi-level structure, such that the voltage rating of the power converter system 100 is increased. The switch assembly 120 contains a combination of actively controlled switches, such as MOSFETs, IGBTs, BJTs, Thyristors/SCRs, GTOs, IGCTs, etc., or a combination of active switches with passive switches, such as PiN diodes, schottky diodes, etc. The DC-link capacitor assembly 110 is configured to provide multiple voltage levels and has multiple corresponding terminals that are connected to the corresponding multi-level switch assembly structure. The inductor assembly 130 is used to reduce the circulating current among the different switch assemblies, as well as to limit the ripple current in each switch assembly 120 to a reasonable level. The inductors in the inductor assembly 130 can be either independent or coupled with each other. Since the power converter system 100 can provide bidirectional current flow, and/or bipolar the output voltage, the same circuit configuration can be applied to a wide range of DC loads and energy sources, for example, passive loads in DC distribution system, DC energy sources such as photovoltaic (PV) panels and fuel cells, all kinds of batteries and super capacitors with two-quadrant current flow, superconducting magnetic energy storage (SMES) coil with two-quadrant voltage polarity, and DC motors with four-quadrant operation.

In the illustrated configuration, the several multi-level DC-DC converter subcircuits 150 are connected in parallel, which improves the current-handling capacity of the power converter 100 over that of a single converter subcircuit 150. The subcircuits, each of which includes one or more semiconductor switching devices, can also be operated in an interleaved fashion, to reduce both the input and the output current ripple, and the output voltage ripple if no filter capacitors are used. This means that the control signals (e.g., gate signals) for corresponding switches in each channel are shifted by some phase angle, e.g. $2\pi/N$, where N is the number of converter channels, such that the input/output ripple current is reduced when the converter channels operate in coordination with one another. This interleaved operation also serves to increase the effective switching frequency, compared to the switching frequency applied to a single one of the subcircuits. The effect of this is to increase the ripple frequency, therefore allowing a reduction in the DC-link capacitor size and simplification and/or size reduction of the output filter.

The converter configuration illustrated in FIG. 1 can be used to obtain several features and advantages. These features and advantages include high current capacity, high voltage capacity, small capacitor and inductor size, and higher switching frequencies, as well as higher power density. The illustrated converter configuration can also be readily realized with a modular and scalable structure, to reduce the converter system cost. The multi-channel configuration of the DC-DC converters increases the current rating of the converter system, via the use of paralleled channels. At the same time, the parallel structure of the converter enables the modular design of switch assemblies 120 and inductor assemblies 130, as well as the scalability of the current rating for different applications. The converter subcircuits 150 as a whole can be designed and manufactured in a modular manner, which simplifies the manufacturing and sourcing process and reduces the converter system cost. The current rating of the converter can be easily scaled by selecting the number of modular converter channels.

The multi-level structure used in each channel allows high DC-link (input side) voltage, despite a wide voltage range and/or low voltage level of the load/source (output side). Employing the multi-level structure in each channel also reduces the voltage stress of inductors. In addition, much lower inductance is needed due to lower voltage stress, compared to the inductance that would be needed for a single-channel converter having the same voltage-handling and current-handling capabilities. The reduced inductor size helps to decrease the physical size of the inductor assembly. Likewise, lower voltage stress of the switches allows the use of faster power semiconductor devices with lower voltage ratings, and further allows switching at higher frequencies while still maintaining high power conversion efficiency. This helps to further improve the power density of the DC-DC converter system.

Interleaving of multiple channels of DC-DC converters also reduces both the input and output current ripple significantly and, at the same time, increases the ripple frequency by a factor of N, where N is the number of interleaved channels. As a result, relatively small DC-link capacitors can be used in the input side, and a smaller filter can be used in the output side load/source.

Interleaving technology has been previously proposed for basic DC-DC converters, including buck, boost, flyback, Ćuk, and single-ended primary-inductor (SEPIC) converters. It has been shown that the amplitude of the input/output current ripple of N (≥2) parallel interleaved modules is always less than or equal to that of the individual modules for these basic DC-DC converters, if the phase shift between the control signals applied among the modules is $2\pi/N$.

Figure 2:
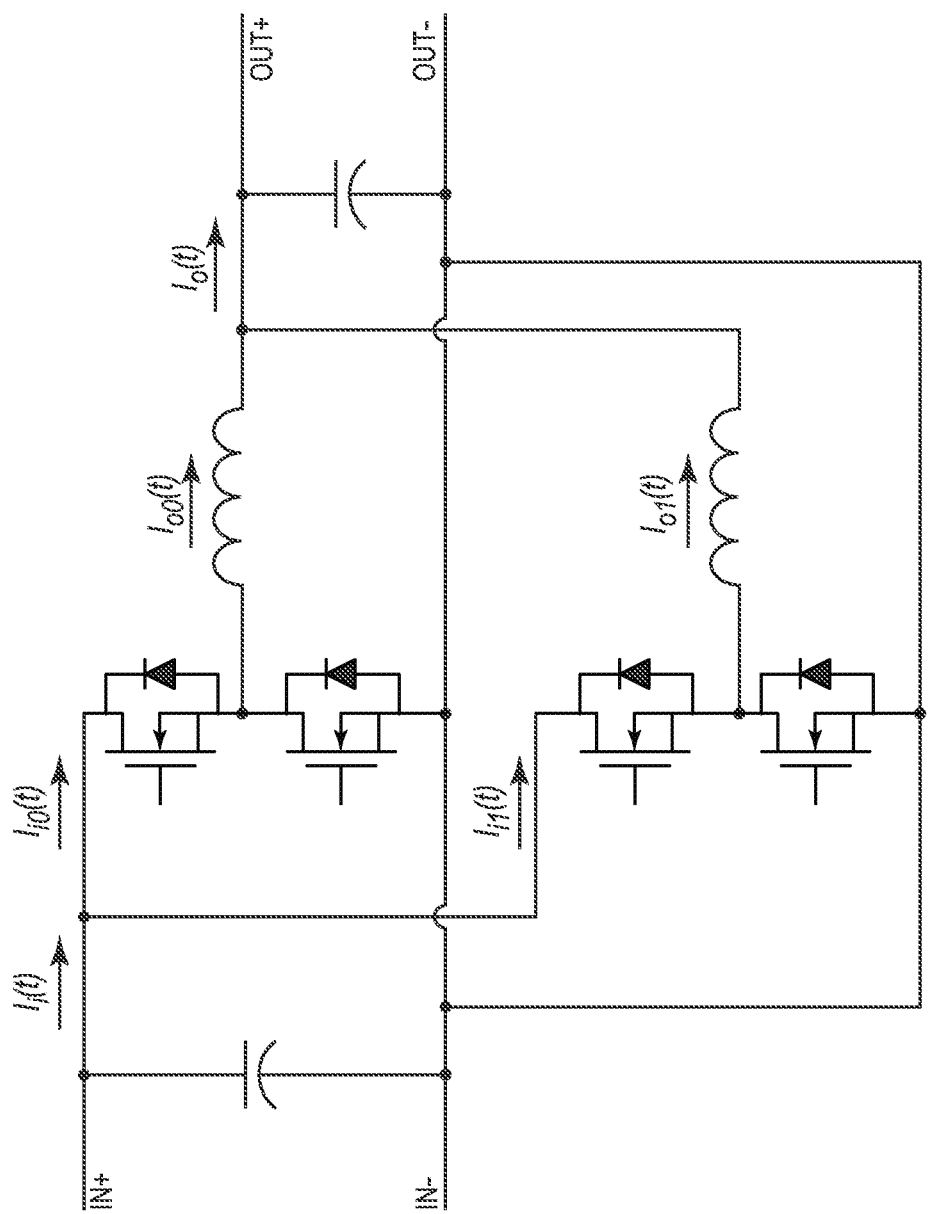
FIG. 2 is a schematic diagram of an interleaved synchronous buck converter.

Interleaving of basic buck converters is widely used for low-voltage high-current applications. FIG. 2 illustrates an interleaved, two-channel, synchronous buck converter suitable for use in a computer CPU voltage-regulation module (VRM) application. In the illustrated circuit, low-side diodes have been replaced by MOSFETs working in synchronous rectification mode to improve the power conversion efficiency relative to a conventional buck converter where the low-side switch is a diode. Interleaved synchronous buck converters are also used in point-of-load applications such as mobile telephone. The use of coupled inductors to improve both the steady state and dynamic performance of voltage-regulating buck converters has also been described.

Figure 3:
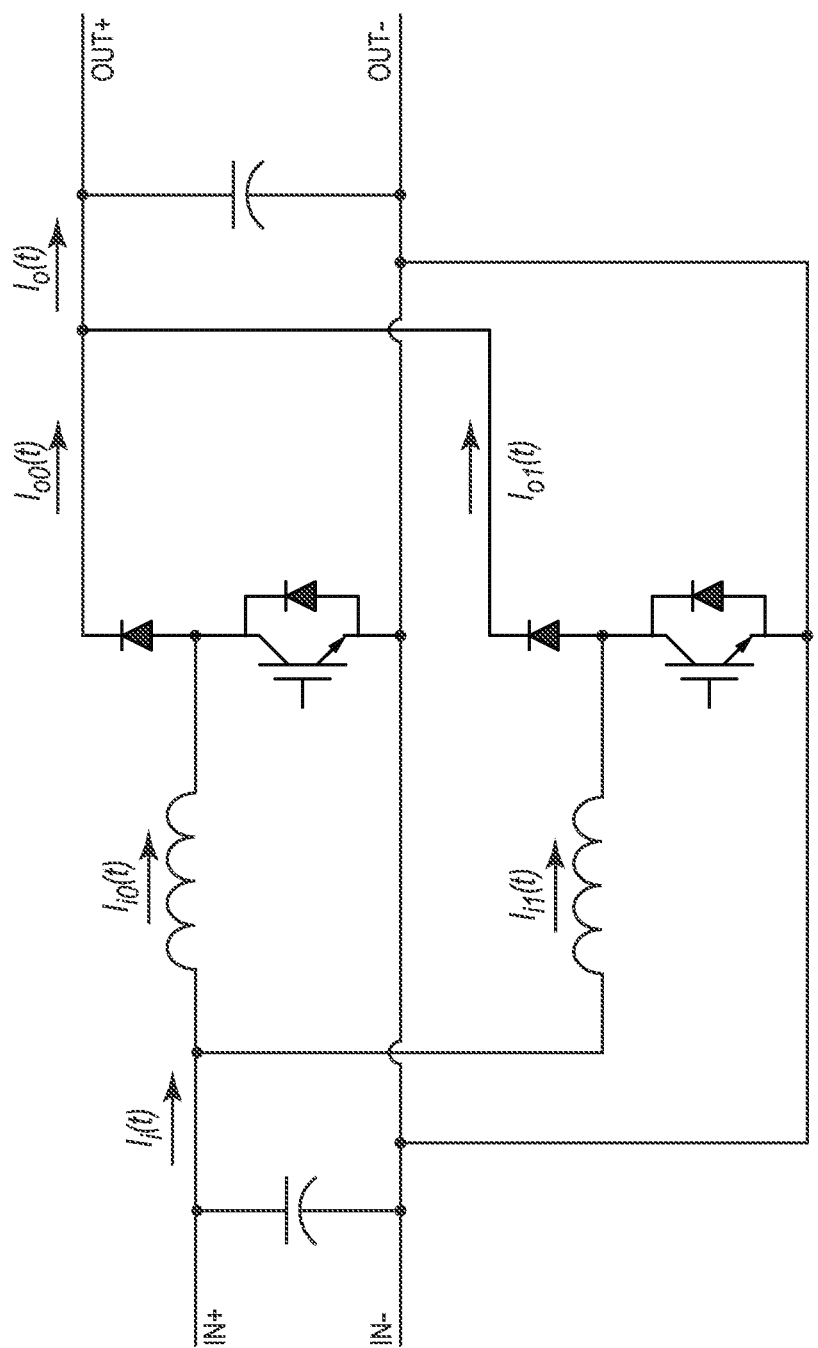
FIG. 3 is a schematic diagram of an interleaved boost converter.
Figure 4:
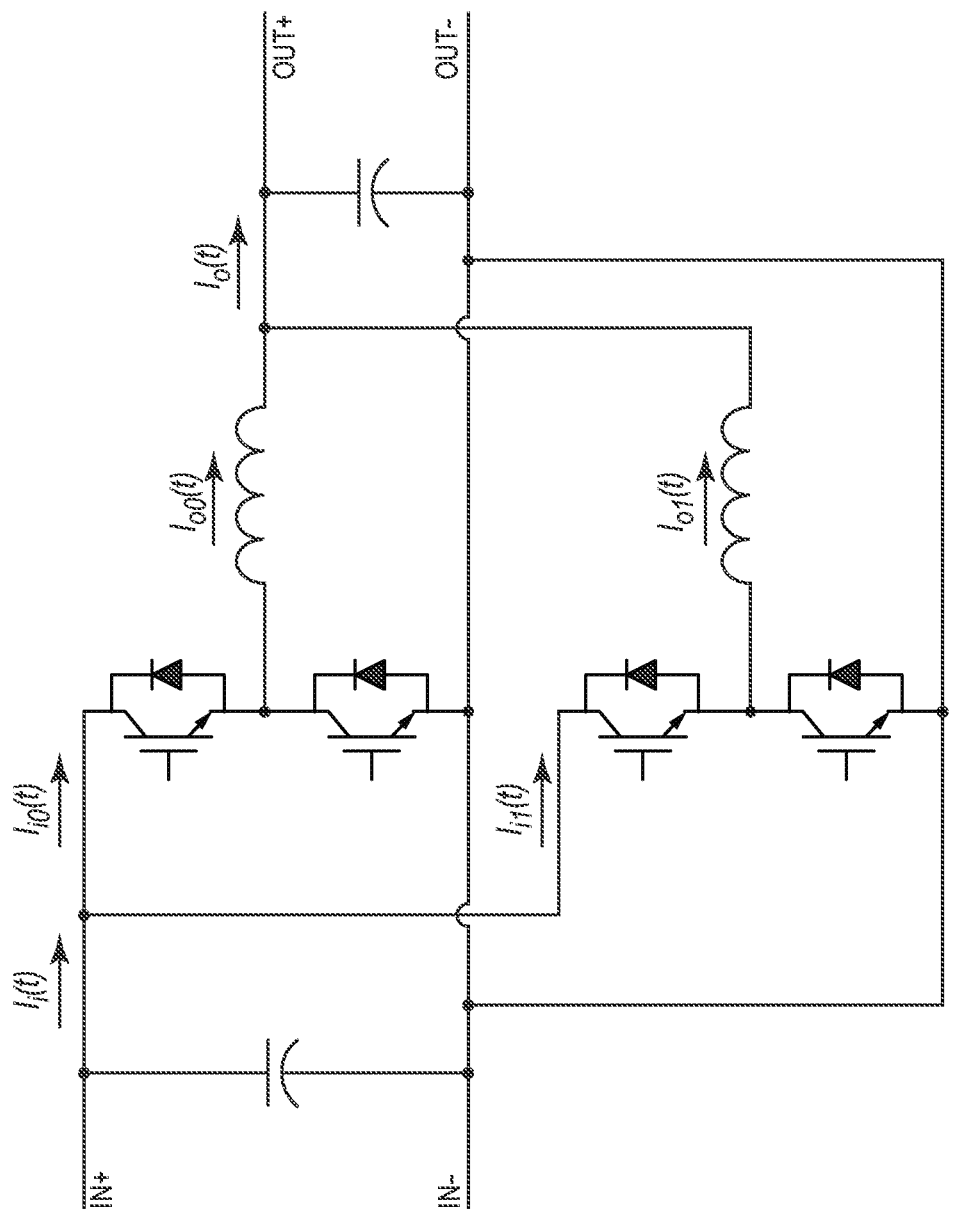
FIG. 4 is a schematic diagram illustrating an interleaved bidirectional half-bridge converter.

Interleaving of basic multi-channel boost converters, as shown in FIG. 3, has also been used. Important applications of interleaved boost converters include fuel-cell electric vehicles, and photovoltaic power conversion chains. Coupled inductors may be used in interleaved boost converters to improve the converter performance, e.g., by increasing power density and reducing current ripple. An interleaved bi-directional half-bridge converter is shown in FIG. 4. Major applications are for battery or supercapacitor energy storage systems, and motor drives with regenerative braking.

Stand-alone multi-level AC-DC rectifiers, DC-AC inverters, and DC-DC converters have been widely used. It should be appreciated that the term "multi-level converter" is a term of art that indicates that a voltage output is synthesized or an input voltage is sourced from three or more levels of DC capacitor voltages. Previously described three-level DC-DC converter configurations include a current-two-quadrant bidirectional DC-DC converter for ultracapacitor energy storage system, as well as a voltage-two-quadrant three-level DC-DC converter for superconducting magnetic energy storage (SMES) system. Three-level neutral point clamping inverter and five-level AC-DC rectifiers have also been described, as have multi-level AC-DC converters for power electronic transformer applications and for motor drive applications.

Figure 5:
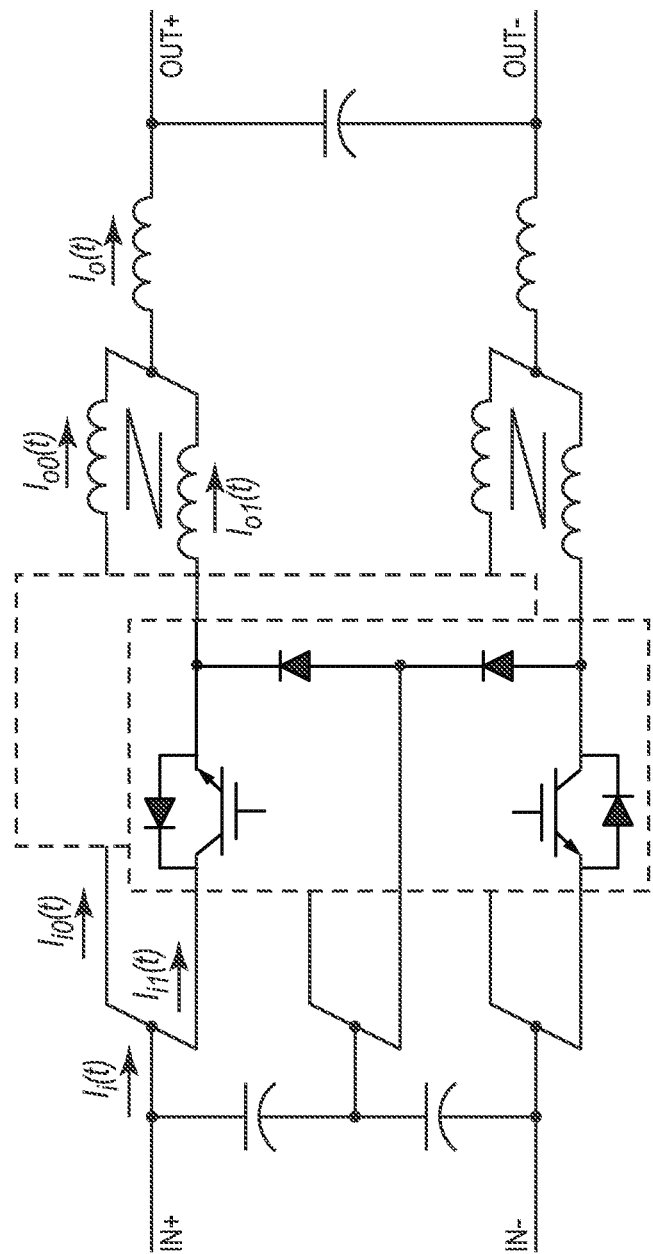
FIG. 5 illustrates an interleaved three-level buck converter.
Figure 6:
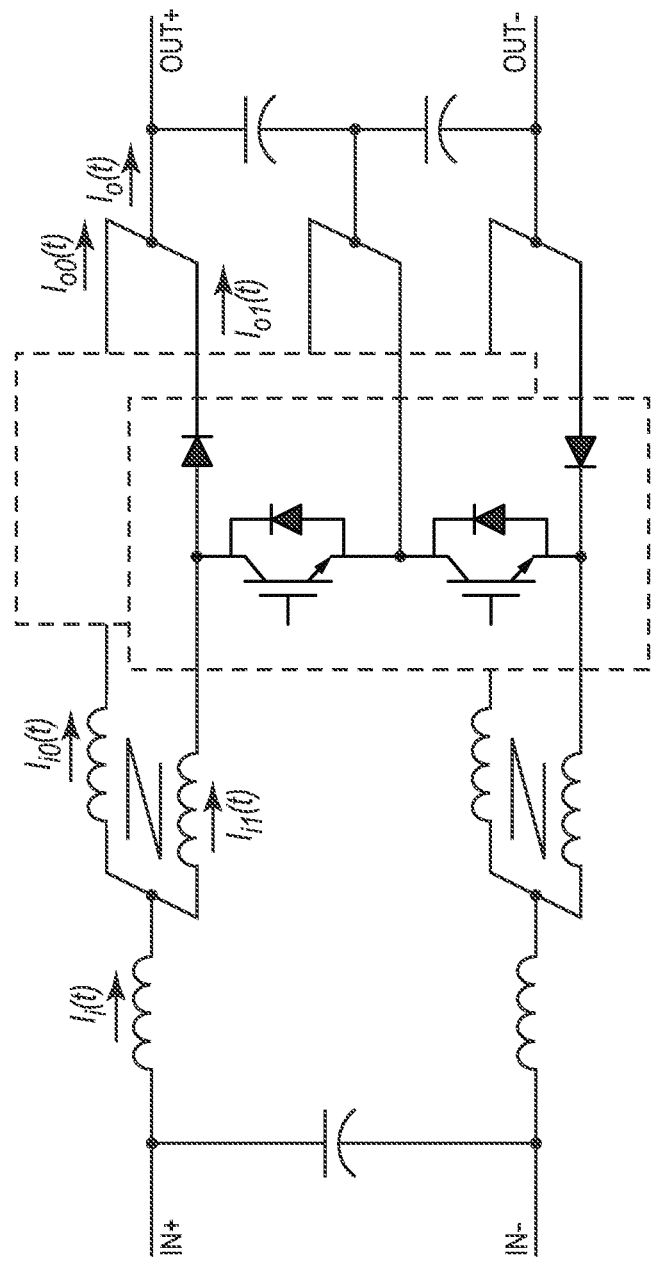
FIG. 6 is a schematic diagram of an interleaved three-level boost converter.

An interleaved, one-quadrant, three-level, buck converter is shown in FIG. 5, while an interleaved, one-quadrant, three-level boost converter is shown in FIG. 6. An interleaved (two channel) three-level (DC-AC) inverter has also been disclosed, for use in hardware-in-loop simulation system for HVDC circuit breakers.

In prior converter circuits, interleaving has only been used for basic DC-DC converters or two-level DC-DC converters, or one-quadrant three-level buck or boost converter. Multi-level, multi-quadrant, interleaved DC-DC converters have not previously been disclosed.

Figure 7:
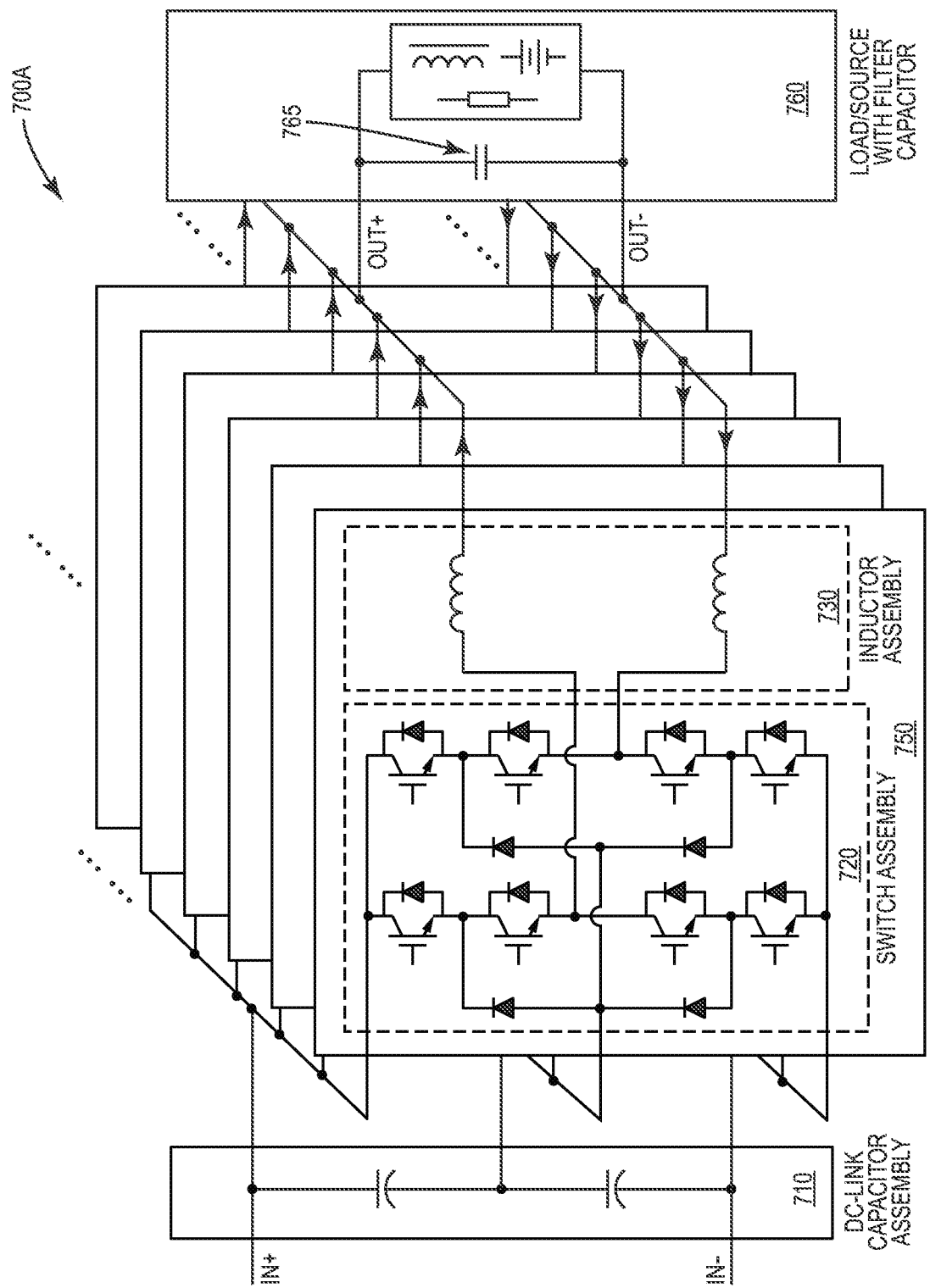
FIG. 7 shows an interleaved, three-level, four-quadrant, DC-DC converter (voltage source type load with filter capacitor), according to some embodiments of the present invention.

FIG. 7 illustrates details of one embodiment of a DC-DC power converter having interleaved, multi-quadrant, multi-level, DC-DC switching converter subcircuits. Converter 700A includes a DC-link three-level capacitor assembly 710, a three-level, four-quadrant, switch assembly 720 in each of several converter subcircuits 750, and an inductor assembly 730 in each converter subcircuit 750. The converter subcircuits are connected in parallel between the multi-level capacitor assembly 710 and a load or source with filter 760. More particularly, the power converter 700A shown in FIG. 7 uses three-level, NPC (neutral-point-clamped), four-quadrant, DC-DC converter. Because the H-bridge configuration is used for each of the converter subcircuits 750 and active power semiconductor devices are used for the H-bridge, the converter 700A can process either bi-directional current (e.g., for a battery application), bipolar voltage output (e.g., for an SMES application), or both of them, i.e., as four-quadrant operation (e.g., for DC motors). Note that converter 700A includes a small filter capacitor 765, connected to the output, to configure the converter as a voltage source for the different types of loads or sources, which may include a resistive load, PV panels, fuel cells, batteries, super capacitors, SMES coil, DC motors, etc.

Figure 8:
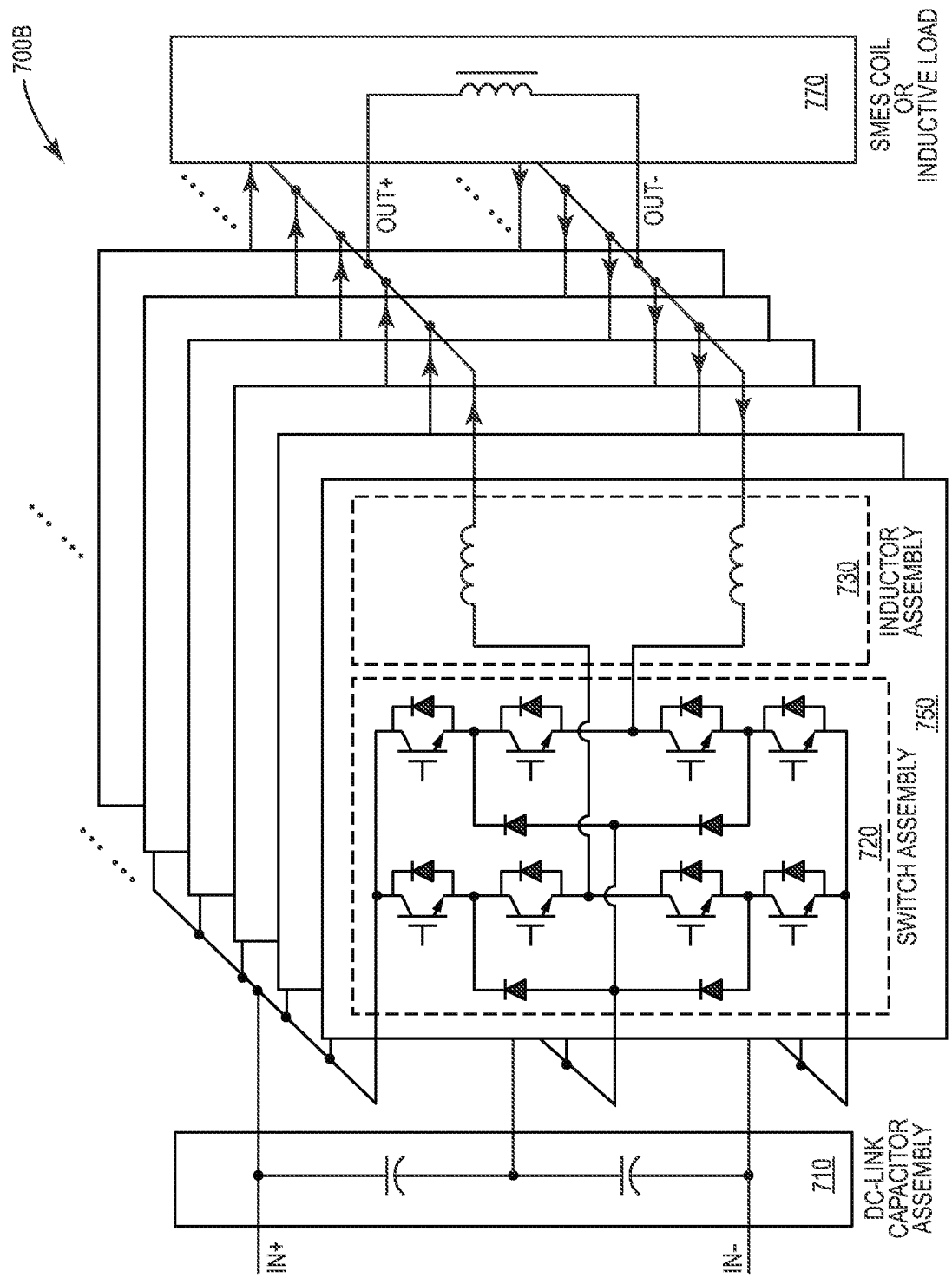
FIG. 8 shows an interleaved, three-level, four-quadrant, DC-DC converter (current source type load without filter capacitor), according to other embodiments of the present invention.

FIG. 8 illustrates a variant of the power converter circuit shown in FIG. 7. Power converter 700B again includes three-level, NPC (neutral-point-clamped), interleaved, four-quadrant DC-DC converter subcircuits 750. In this case, however, there is no filter capacitor at the output. Rather, the outputs of the converter subcircuits 750 are connected directly to the source/load 770, which may be an SMES coil or DC motor, for example, thus making the output a current source.

Figure 9:
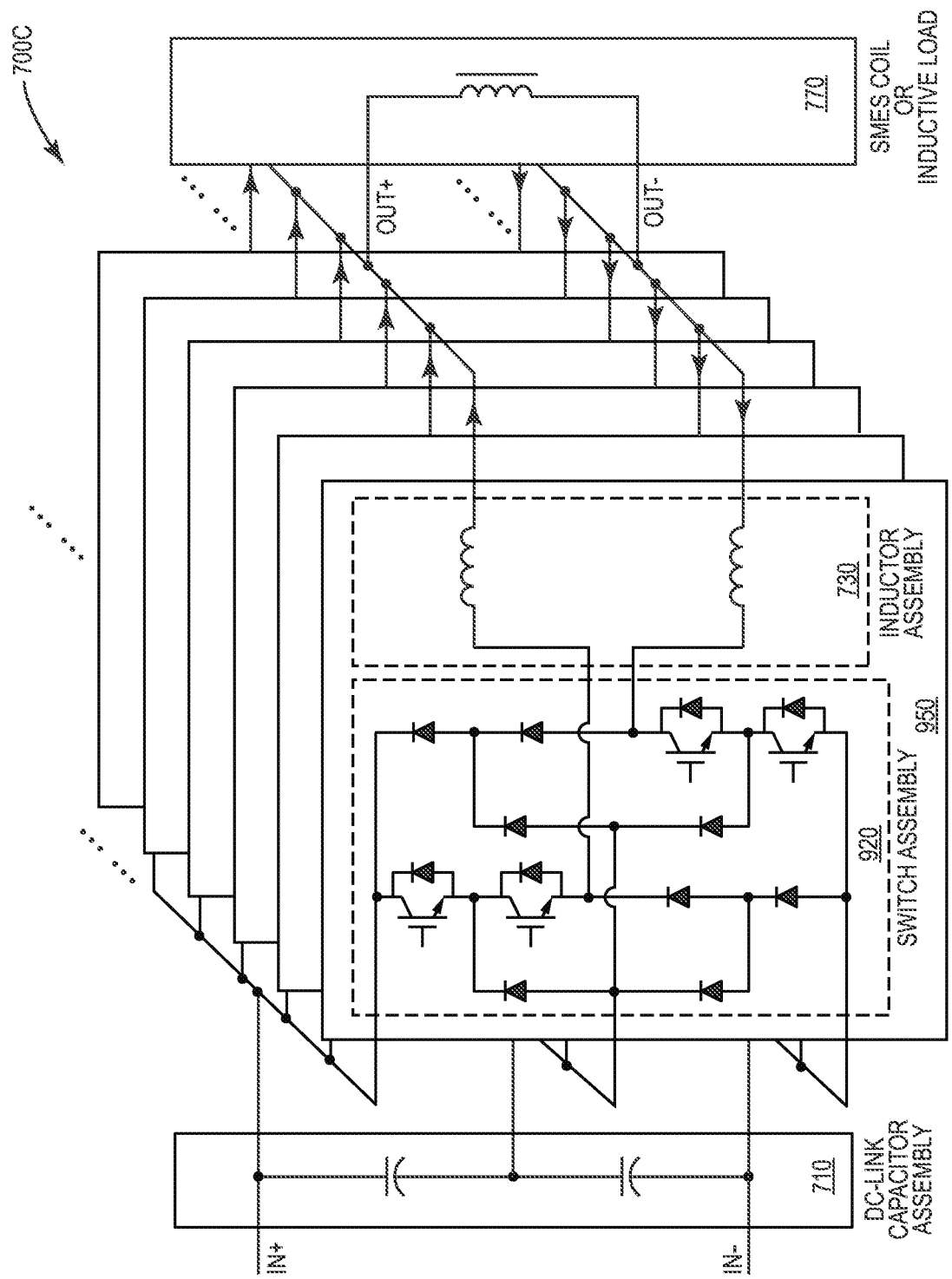
FIG. 9 illustrates an example interleaved, three-level, voltage-two-quadrant, DC-DC converter.

In another variant, illustrated in FIG. 9, the interleaved converter subcircuits 950 each include a three-level, voltage-two-quadrant, DC-DC converter 920. This configuration can be employed for SMES applications, where support for bipolar output voltages is required. Because the H-bridge configuration is used for each of the converter channels, a bi-polar voltage output can be obtained to charge and discharge the SMES coil. Only one-third of the power semiconductor devices in the H-bridge converter are active devices, in this configuration, while the rest are diodes, so the converter output current is uni-directional.

Figure 10:
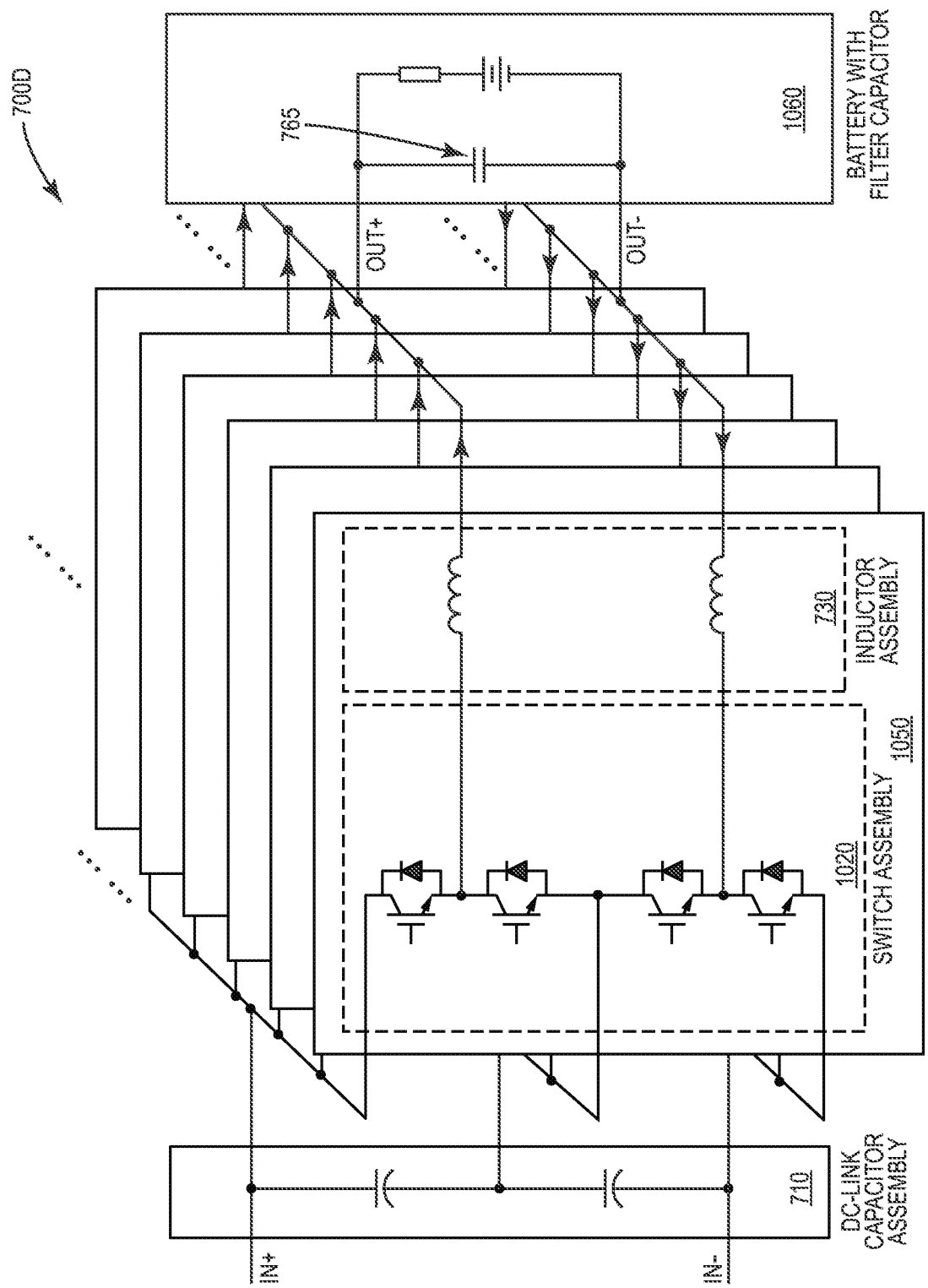
FIG. 10 shows an example interleaved, three-level, current-two-quadrant, DC-DC converter.

Still another variation is shown in FIG. 10. In this case, the interleaved converter subcircuits 1050 each include a three-level current-two-quadrant DC-DC converter 1020. This configuration can be employed for battery-based energy-storage applications, for example. Since the output voltage polarity is unidirectional, an H-bridge or full-bridge configuration is not required, and a three-level half-bridge configuration is used. With active switches in the half-bridge, bi-directional current can be obtained to charge and discharge the battery 1060, which is shown with a filter capacitor 765 in FIG. 10.

Figure 11:
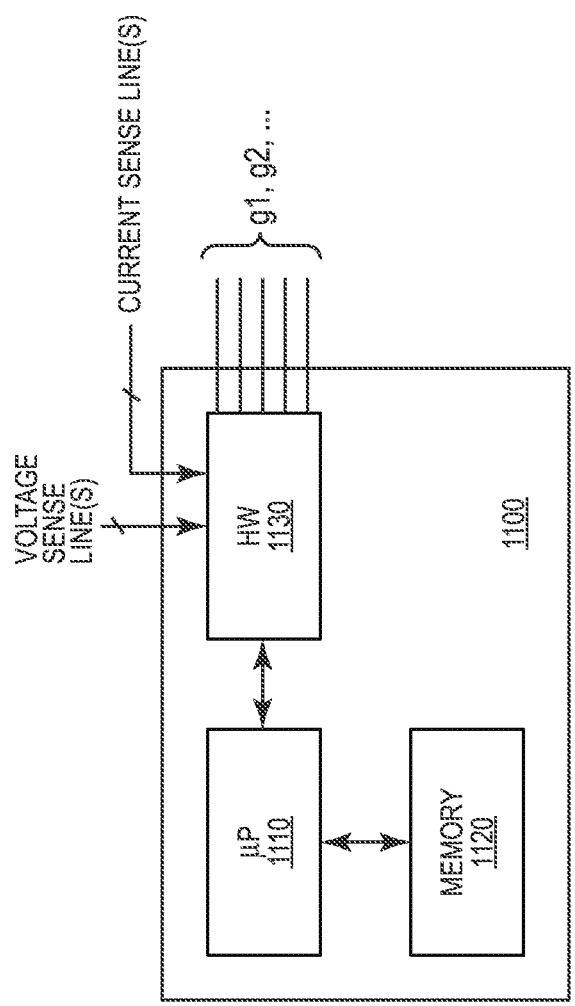
FIG. 11 is a block diagram illustrating components of an example control circuit.

Connected to the switching elements in the circuits of FIGS. 1, 7, 8, 9, and 10, but not illustrated in those figures, are control circuits configured to drive control inputs of the active switching elements in the converter subcircuits. The control circuit providing these control signals can be an appropriately programmed microcontroller or Field-Programmable Gate Array (FPGA), or the like; an example of such a control circuit 1100 is shown in FIG. 11, which includes a microprocessor 1110, memory 1120, and digital/analog hardware circuit 1130. In the illustrated control circuit 1100, hardware circuit 1130 outputs a set of control voltages g1, g2, . . . , each of which corresponds to one or more switching elements in one of the step-down converter circuits described above. In the illustrated circuit, feedback from the converters is provided via the "VOLTAGE SENSE LINE(S)," to allow for controlling of the DC output from the corresponding converters, and "CURRENT SENSE LINE(S)" to allow balancing and control of the channel currents. Hardware 1130 thus may include one or more analog-to-digital (A/D) converters, in some embodiments, to convert the analog signals on the one or more voltage sense lines to digital signals suitable for use by microprocessor 1110. Of course, variants of the circuit illustrated in FIG. 11 may employ a microcontroller device that incorporates not only a processor element but that also includes one or more A/D converters, in which case A/D converters need not be provided in separate hardware.

Microprocessor 1110 is configured, using program instructions stored in memory 1120, to pulse-width modulate the control inputs of the active switching elements of the converter subcircuits, according to known techniques applicable to the particular subconverter switching converter. Memory circuit 1120 may comprise one or several memory devices and/or memory types, such as flash memory or other non-volatile memory, random-access memory (RAM), read-only memory (ROM), etc.

It will be appreciated that the control circuit shown in FIG. 11 is but one example of a circuit that can be adapted to control the power converter circuits disclosed herein. Other control circuits, including those that rely in whole or in part on analog feedback and control are also possible. In any case, the control circuit is configured so that the control inputs for the separate converter subcircuits are controlled such that corresponding switching semiconductors in each of the switching converter subcircuits are switched in an interleaved manner. For example, if there are three converter subcircuits connected in parallel, the control signals to the respective subcircuits should generally be 120 degrees out of phase with one another, with respect to the switching frequency, to balance the current-handling loads across the subcircuits. More generally, the control signals for each subcircuit should be separated by a phase angle of $2\pi/N$, where N is the number of channels/subcircuits.

It should be understood that the present invention is not limited to the particular circuit configurations illustrated in FIGS. 7, 8, 9, 10, and 11. Instead, these configurations should be understood to be examples of power converters that include two or more multi-quadrant, multi-level, DC-DC, switching converter subcircuits, connected in parallel at respective input and output sides, so as to provide a multi-channel, multi-quadrant, multi-level configuration, where the switching converter subcircuits are switched in an interleaved manner. While several of the pictured converter circuits include several multi-level, neutral-point-clamped converters, for example, other subcircuit topologies may be used instead, such as athe active neural-point-claimed topology, topologies using flying capacitors, etc.

There is a wide range of applications for the multi-channel, multi-level, multi-quadrant, DC-DC converters described. A general application of these circuits is to connect a high current load or source, having a relatively low voltage, to a DC-link side that has a relatively high voltage rating, and to control the DC rating load or DC source. The DC-link side could be a DC grid system, or the DC terminals of an inverter or rectifier.

One principle application is with superconducting magnetic energy storage (SMES) system. The interleaved multi-channel and multi-level DC-DC converter system connect the SMES coil to a grid-tied inverter. In this application, the SMES coil is used as the energy storage device for the grid to smooth the power fluctuations. The current rating of the high power and high energy SMES coil can be thousands of amperes. The voltage polarity of the coil is bidirectional, due to the charging and discharging operation, and the coil voltage varies in a very wide range for different power absorbed or injected to the grid. On the other hand, DC link of high power inverters has a higher voltage rating than that of SMES coil, and is constant. A multi-level, multi-channel, multi-quadrant DC-DC converter as disclosed herein can accommodate the large voltage difference between the DC link and the SMES coil, and also controls the voltage applied to the coil. In addition, the required current rating of the inverter is significantly reduced due to high AC and DC-link voltage such that conventional voltage source converter (VSC) can be used for this application. Multiple channels of DC-DC converters increase the current rating of the converter, whereas a single DC-DC converter cannot handle the SMES coil current with thousands of amperes. Interleaving technology reduces the current ripple amplitude significantly in both the input DC-link side and the output load/source side, which results in much smaller DC-link capacitor size and output filter size.

Another principle application for the circuits disclosed herein is the PV farm. In addition to wind energy, solar energy is another important renewable energy source. Photovoltaic (PV) panel is the device to capture solar energy. One of the major issues for today's PV system is high capital cost. A large-scale solar farm, with thousands of PV panels, helps to reduce the specific cost of the system, but requires high-power central converters. The multi-channel, multi-level, multi-quadrant, DC-DC converters described above can be used to connect the large PV farm to the grid through an inverter. Such a converter can implement maximal power point tracking (MPPT) control, and reduces the ripple current of the panels, thus minimizing the size of the passive components. The modular design of these converters simplifies the manufacturers' product line and reduces both the manufacture and maintenance cost.

Similarly to PV farm applications with unidirectional current and unipolar voltage source, the circuits can be used in fuel cell systems because the interleaved multi-quadrant, multi-channel and multi-level DC-DC converters can also operate in one quadrant. The fuel cell system can benefit from the low current ripple of the converter due to interleaving, which is important to extend the lifetime of fuel cells. The DC-DC converter systems can also be used for DC load with unidirectional current and unipolar voltage. Applications include electrochemical processes such as electrodialysis, electrolysis, and industrial processes where high DC current is required.

Another important application for these circuits is the battery energy storage system (BESS) (and super capacitors as well), where voltage is unipolar but bidirectional current is required to charge and discharge the battery. The low battery pack voltage can be boosted up to the high DC-link voltage level by the DC-DC converter, and the charging and discharging of batteries is controlled by the converter. The large battery voltage variation due to the state-of-charge change is also tolerated by the DC-DC converter. The low ripple current helps to extend the battery lifetime. The BESS is used both in grid applications and in plug-in electric vehicle (PEV) applications. The DC-DC converters can also be used as fast chargers for electric vehicles, and for vehicle-to-grid (V2G) applications to support the distribution grid power quality.

Still another principle application is the DC motor drive, where four-quadrant operation of the DC motors is satisfied. The DC-DC converter systems with H-bridge configuration in each channel enable bidirectional current flow and bidirectional voltage polarity for DC motors, such that they can rotate in both directions and the brake energy can be regenerated and captured through the DC-DC converter. Interleaving of the DC-DC converter channels can allow high motor current rating and in the meanwhile reduce the filter size. Multi-level converters allow the motor to be connected to medium-voltage level DC-grid through the DC-DC converter.

Accordingly, the disclosed interleaved, multi-channel, multi-level, and multi-quadrant DC-DC converters can be used in DC grid system to manage various DC loads and sources, and to connect different DC grids and control the power flow.

As detailed above, interleaved multi-level converters are good solutions for high power DC-DC conversion with high voltage rating, large and scalable current rating, and modular structure. Capacitor size can be significantly reduced by interleaving. However, the total energy storage requirement in inductors does not benefit from the interleaving. Phase inductors are required to control the current ripple in each converter channel and to mitigate the circulating current. With proper design, coupled inductors can be used to achieve similar current ripple amplitude but with smaller volume than that of uncoupled inductors. This is due to the cancelation of DC magnetic flux with coupled windings.

The power loss of the coupled inductors is also lower than that with the uncoupled case. One analysis shows a 24% volume reduction and a 17% power loss reduction, making the converter more compact and efficient. Also, less core and copper materials are used, which helps reduce the cost of the coupled inductors.

Figure 12:
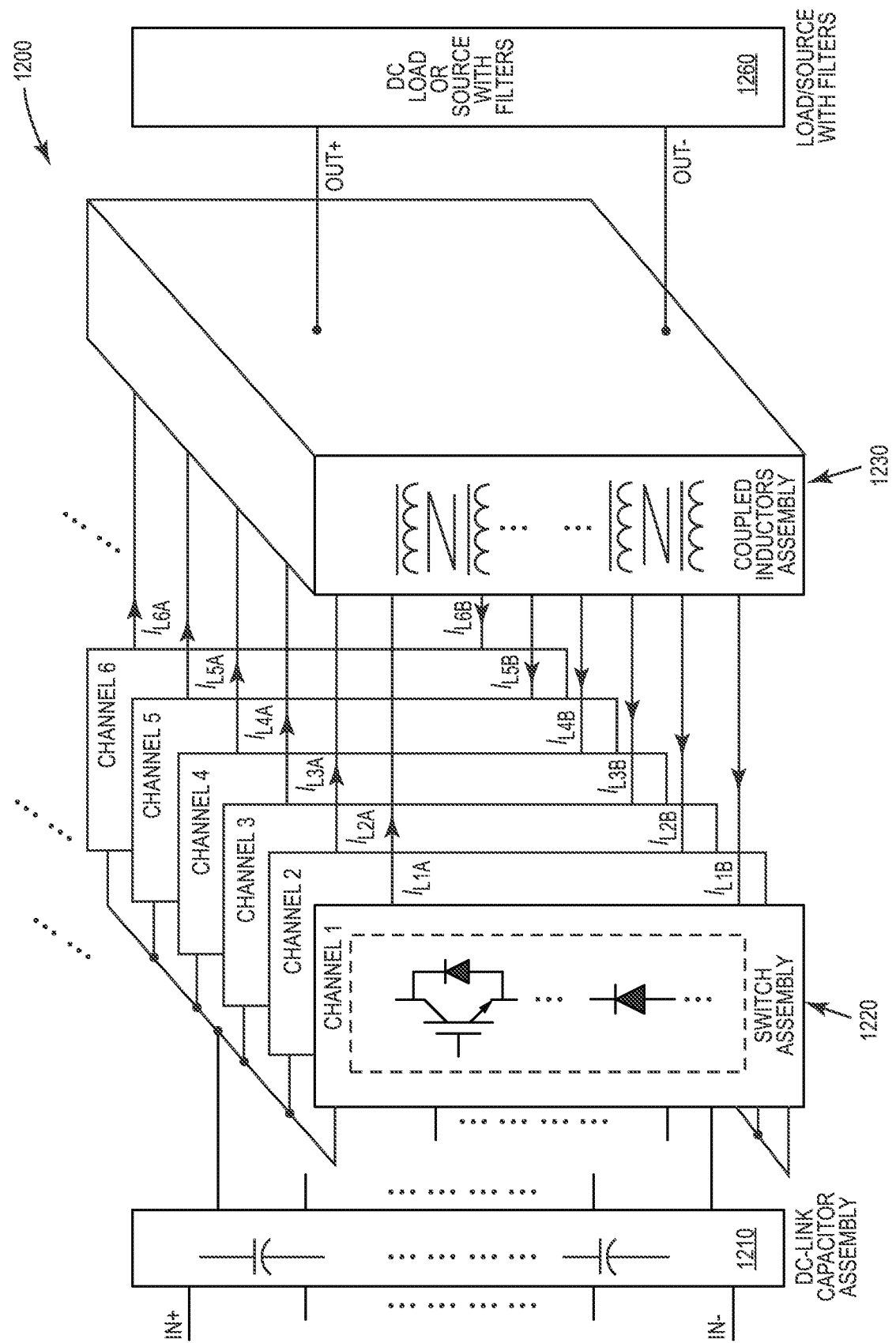
FIG. 12 is a schematic diagram illustrating an interleaved, multi-channel, multi-level, DC-DC converter with coupled inductors.

FIG. 12 shows a generalized structure of an interleaved, multi-channel, multi-level DC-DC converter 1200, including a coupled inductor assembly 1230. The converter 1200 consists of an input DC-link capacitor assembly 1210, a multi-level switch assembly 1220 in each channel, one coupled inductor assembly 1230 and one load or source with filter 1260. The switch assemblies 1220 can be configured to be one of the several multi-level structures such that the voltage rating of the converter system is increased, or so that the low rating power semiconducting devices can be used.

As shown in FIG. 12, the inductor assembly 1230 is inserted between the multiple channels of switch assemblies 1220 and the load/source 1260. The inductors help to balance the current among different channels and reduce the circulating current, and also to limit the ripple current amplitude in each channel to avoid high peak current in the switches.

The multiple switch assembly channels are interleaved; that is, the corresponding control signals of the switches in different channels are shifted by some angle in the time domain. The interleaving is used to reduce the input and output current ripple such that smaller filters can be used.

As seen in FIG. 12, at least two inductors are magnetically coupled together to build coupled inductors. The inductor assembly 1230 consists of coupled pairs, and the assembly has multiple input ports from switch assemblies and an output port connected to the load/source 1260. The DC-DC converters with coupled inductor arrangement have better performance than those with separate (uncoupled) inductors. It should be understood that other arrangements of magnetically coupled inductors in interleaved DC-DC converters, including the multi-quadrant, multi-level DC-DC converters disclosed herein, are possible. For example, a coupled inductor pair can be implemented with two un-coupled inductors in series to a transformer with two well-coupled windings. In some, more than two inductors can be coupled to a common core structure.

Figure 13:
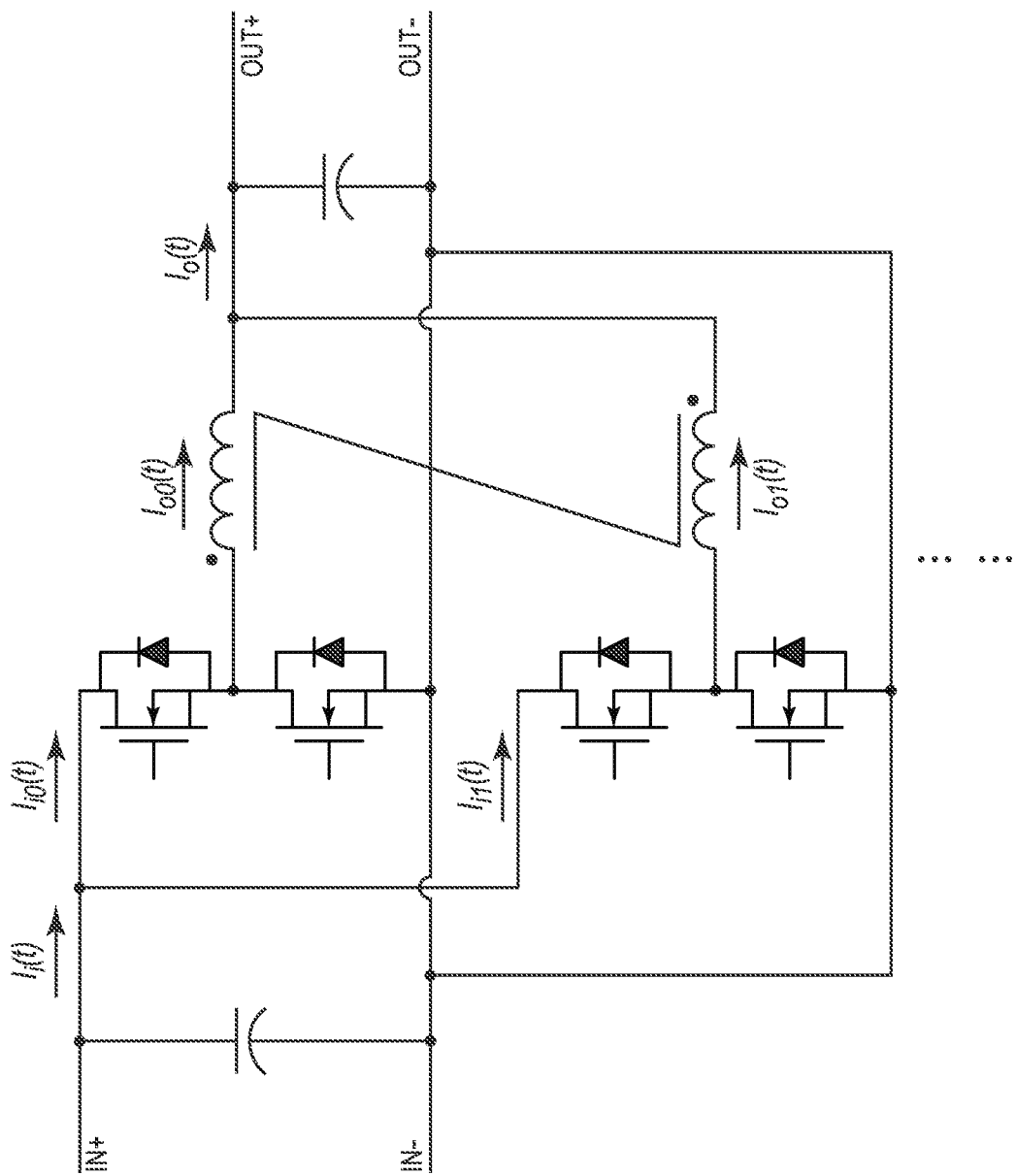
FIG. 13 shows an interleaved synchronous buck converter with inverse coupling.
Figure 14:
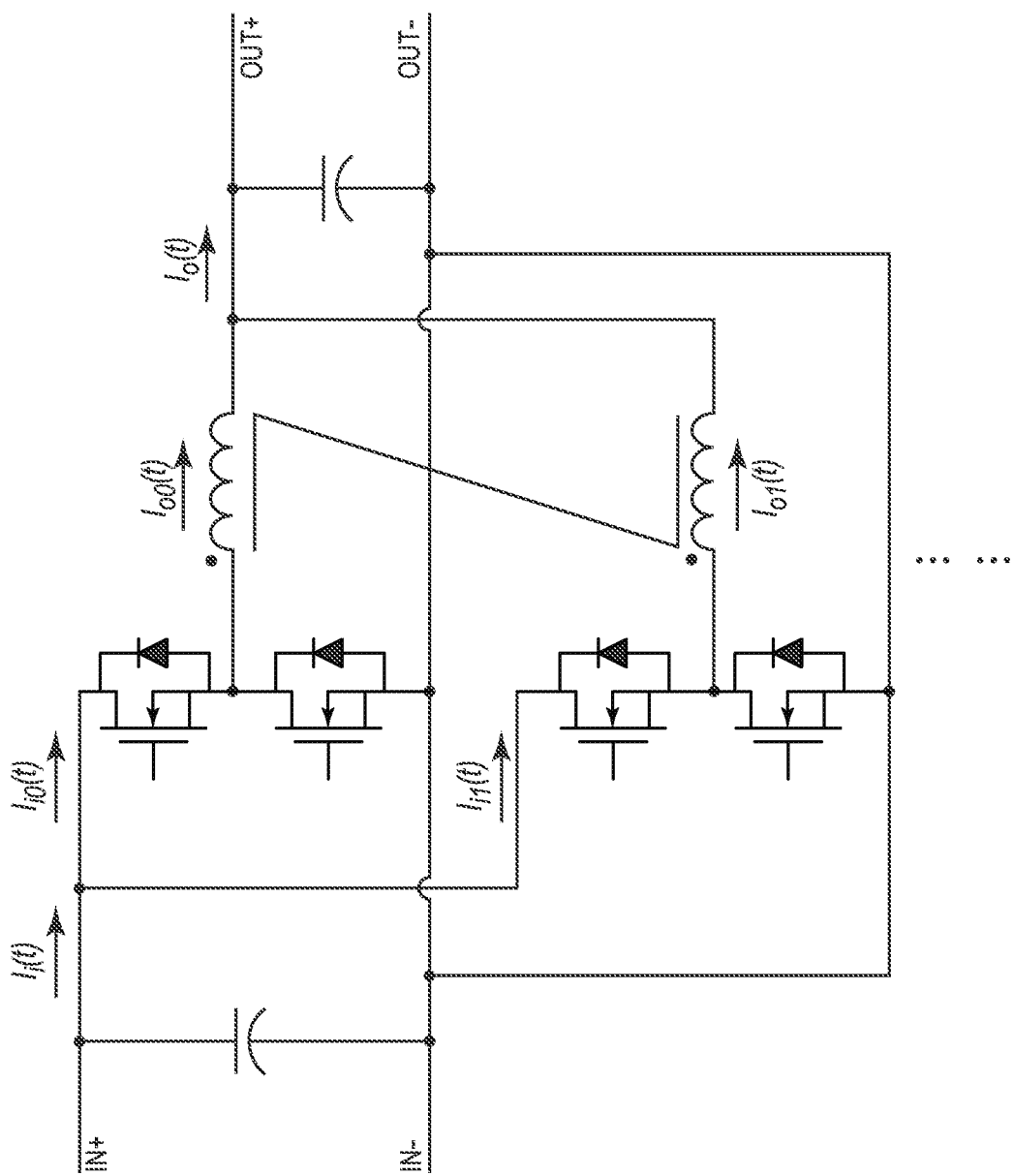
FIG. 14 illustrates an interleaved synchronous buck converter with direct coupling.

Pairs of coupled inductors have previously been employed in major types of two-level DC-DC converters, as well as in one-quadrant (1Q), three-level, two-channel, buck and boost DC-DC converters. One example is shown in FIG. 13, which illustrates an interleaved synchronous buck converter with inverse coupling between the inductors in the two channels. FIG. 14 shows an interleaved synchronous buck converter with direct coupling.

The possibility of improving both the steady-state and transient performances is the main benefit of applying coupling inductors in voltage regulators. With inverse coupling (M<0, where M is the mutual inductance) of two inductors and with proper selection of the coupling coefficient, the equivalent inductance for ripple current can be increased and the steady-state inductor ripple current is reduced. As a result, the loss on MOSFETs and output capacitors is less and converter efficiency is improved. On the other hand, with inverse coupling (M<0) of two inductors, the equivalent inductance for transient response is reduced and the dynamic performance of the voltage regulator is improved.

Direct coupling, as shown in FIG. 14, may be used to reduce the passive component size in an integrated converter with coupled inductors. For example, analytical results show that an interleaved synchronous buck converter with direct coupling (M>0) reduces the total output current ripple and is a good compromise for a drastic reduction of capacitors and inductors size, even though there is large current ripple in the inductors. Coupling of multiple inductors in a common core can also be used for multi-phase buck converters.

The converters shown in FIGS. 13 and 14, as well as several other previously used circuit configurations, employ coupled inductors, but the coupling is between multiple channels of a multi-channel or multi-phase converter. In contrast, the mutually coupled inductors in the circuit shown generally in FIG. 12 are within the same channel. This approach provides significant advantages with respect to modularity and scalability, as each channel is self-contained and can be manufactured and maintained in a modular fashion.

Figure 15:
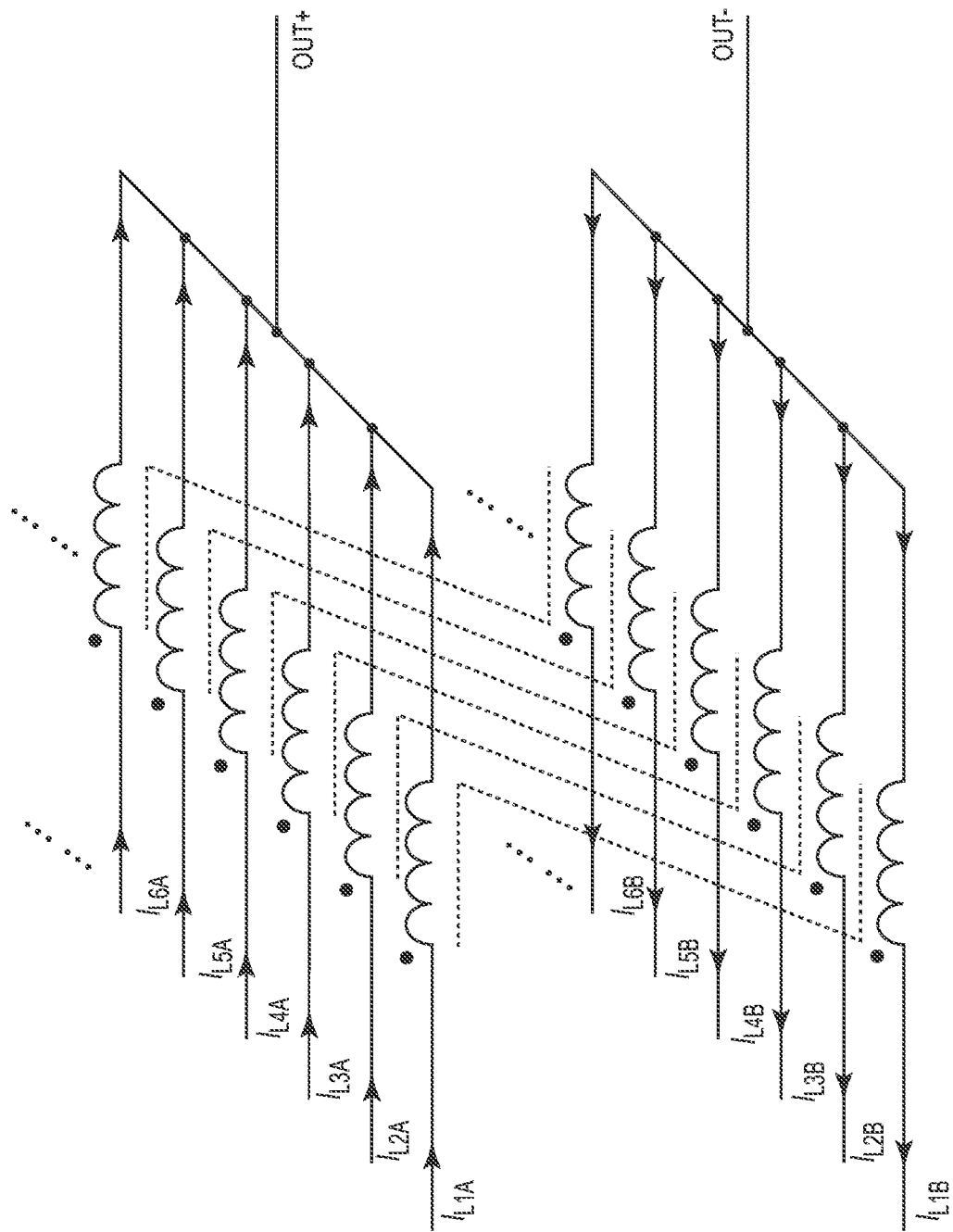
FIG. 15 illustrates inductor coupling in pairs between phases A and B in each channel of an example embodiment.

This can be seen in FIG. 15, which shows a coupled inductor arrangement for an interleaved, six-channel, three-level, DC-DC converter. In this embodiment, two inductors in each channel from the switch assembly phase A output and phase B output are coupled together. The current $i_{L \times A}$ represents the output current from the phase A, while $i_{L \times B}$ represents the current returning to the phase B. There is no magnetic coupling among the channels—rather, the coupling is only within each channel. The polarity of the coupled inductors is also shown in FIG. 15, as indicated by the dots. When the current flows into the dot on one inductor being coupled, the return current should flow out from the dot on the other inductor being coupled.

The coupling coefficient between the two coupled inductors can range from 0 to 1. With this arrangement, the DC flux of the core legs surrounded by the two corresponding windings can be partially canceled, resulting in the reduced cross section area of the core legs. The total size and power loss of the coupled inductors can be reduced. The ripple flux of the two legs can be shifted by some angle with the shifted carrier angle between the phase A half-bridge and the phase B half-bridge, such that the total summed flux ripple amplitude is reduced, resulting in smaller core loss.

Figure 16:
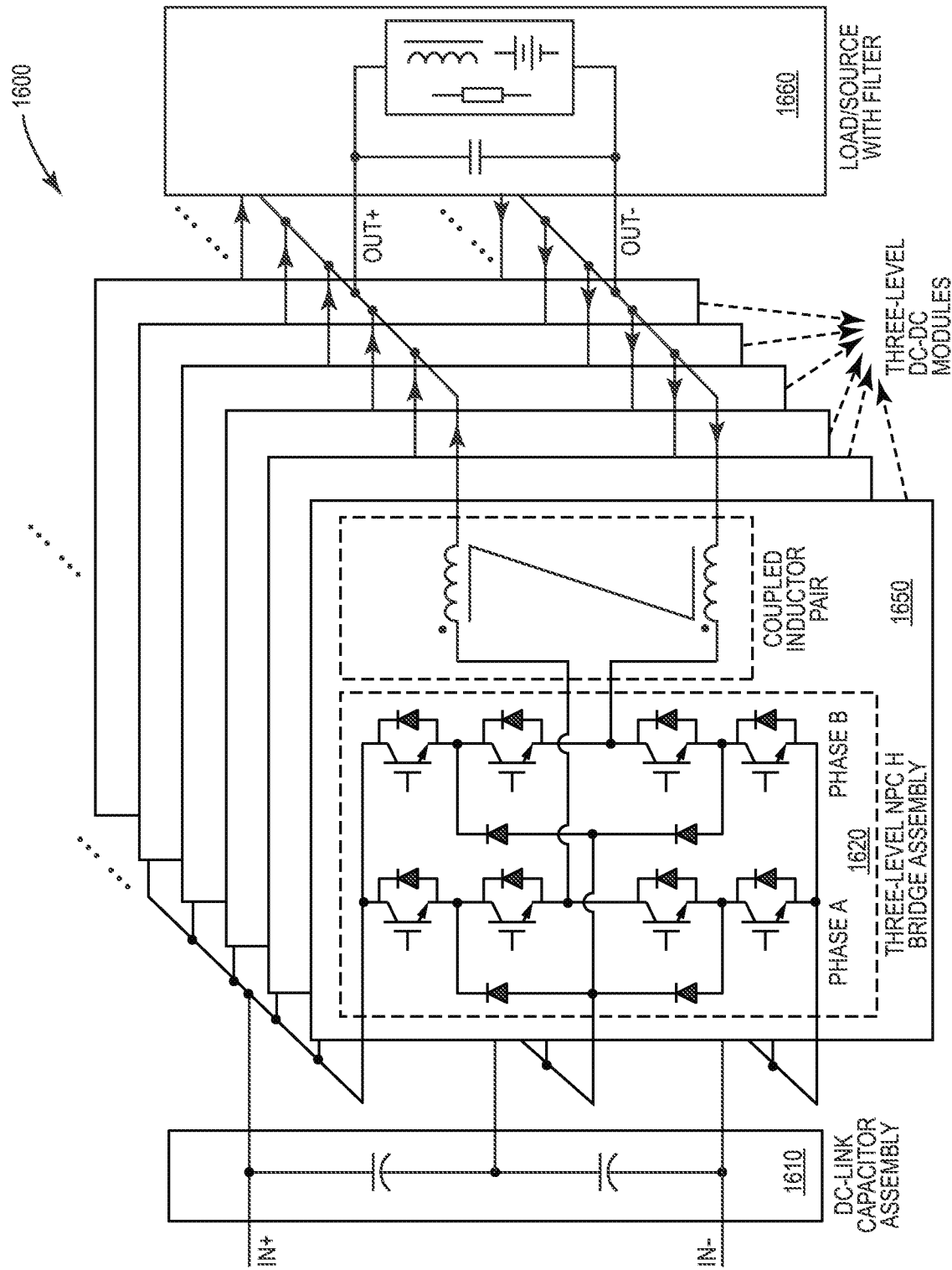
FIG. 16 shows a modularized DC-DC converter with coupled inductor pairs between phases A and B of another example embodiment.

Coupled inductor pairs in each channel can be used to implement the coupled inductor assembly for an interleaved, multi-channel, three-level, four-quadrant, DC-DC converter 1600, as shown in FIG. 16. In this embodiment of the converter with coupled inductors, a switch assembly 1620 and a pair of coupled inductors 1630 comprise one channel 1650. Since each of the channels 1650 has the same structure, a modular design for each channel 1650 can be realized. Then the interleaved multichannel multi-level DC-DC converter 1600 can be constructed by simply connecting the input of the modules to a capacitor bank 1610 and the output of the modules to the load/source 1660.

The coupled inductor pairs can be packaged in each module. The coupling of the two inductors in each module reduces the size and loss of the magnetic components and results in a more compact and more efficient converter channel. The modularized design of each channel helps simplify the manufacturing process, reduces the converter cost, and improves the reliability.

Figure 17:
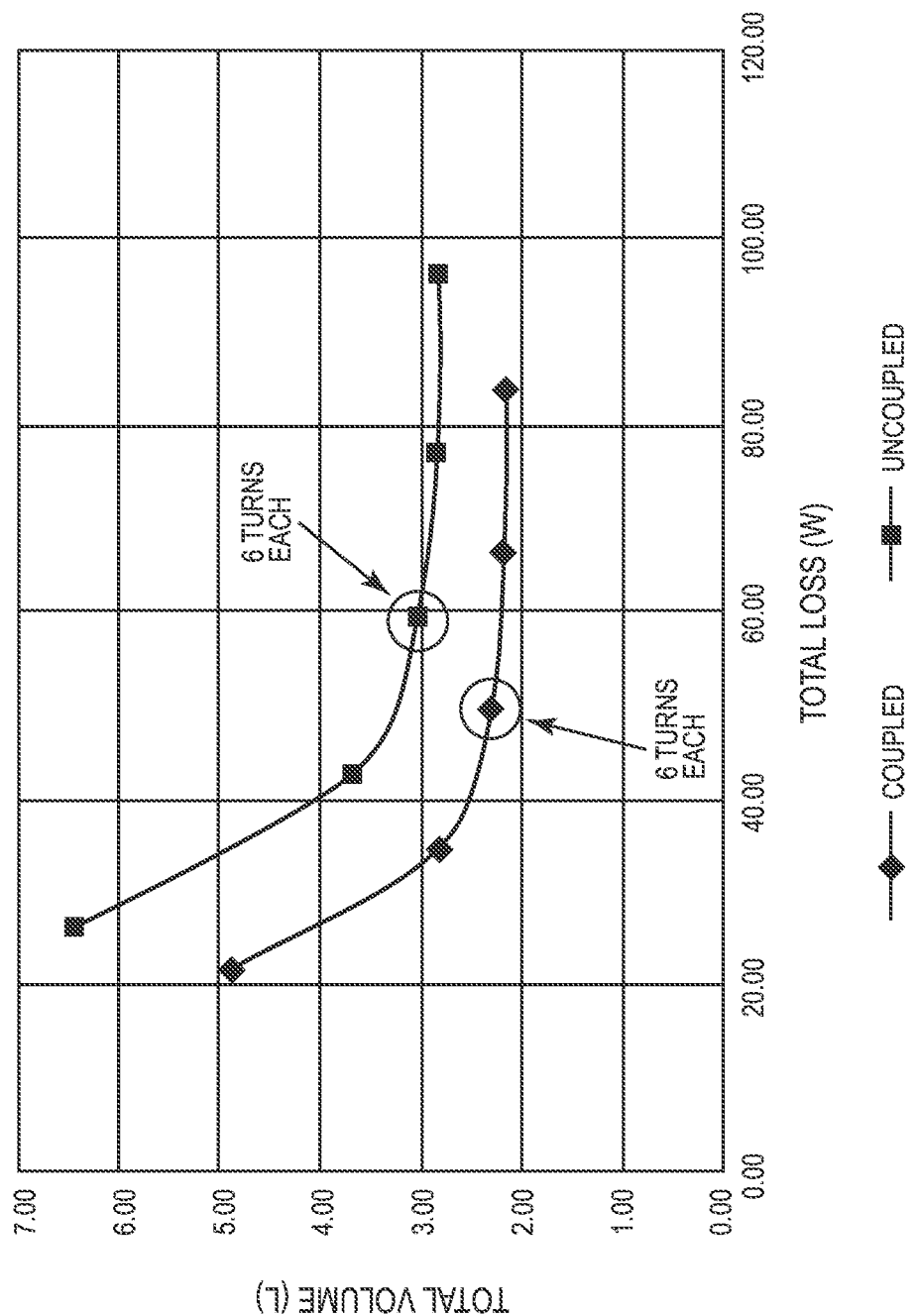
FIG. 17 shows a comparison of the sizes and losses for coupled and inductor pairs in a design example.

A comparison of the total volume and total power loss for a coupled inductor pair and uncoupled inductor pair is illustrated in FIG. 17. The self-inductance is the same for both. Consistent design criteria are utilized, such as the same peak flux density for core, the same current density for the winding, the same core material, the same switching frequency, etc., making the comparison fair. The dots on the curves are corresponding to different number of turns for the windings. The change of the number of turns covers the design alternatives with different performance. For example, with the fewer number of turns, the total power loss of inductors is smaller, but the total volume is larger. With increased number of turns, the inductor size shrinks, but the total loss increases. As a good compromise between the total volume and total loss the inductor pair, an example design point is circled in FIG. 17.

It will be appreciated that the curve of coupled inductor pair is closer to bottom left corner, which means smaller volume and loss. Thus, FIG. 17 shows that better performance can be achieved with coupled inductor compared to separate inductors in terms of the smaller size and lower power loss. For illustration, at the selected design points, 24% volume saving and 17% power loss saving can be achieved by the coupled inductors, with a coupling coefficient of 0.5.

Figure 18:
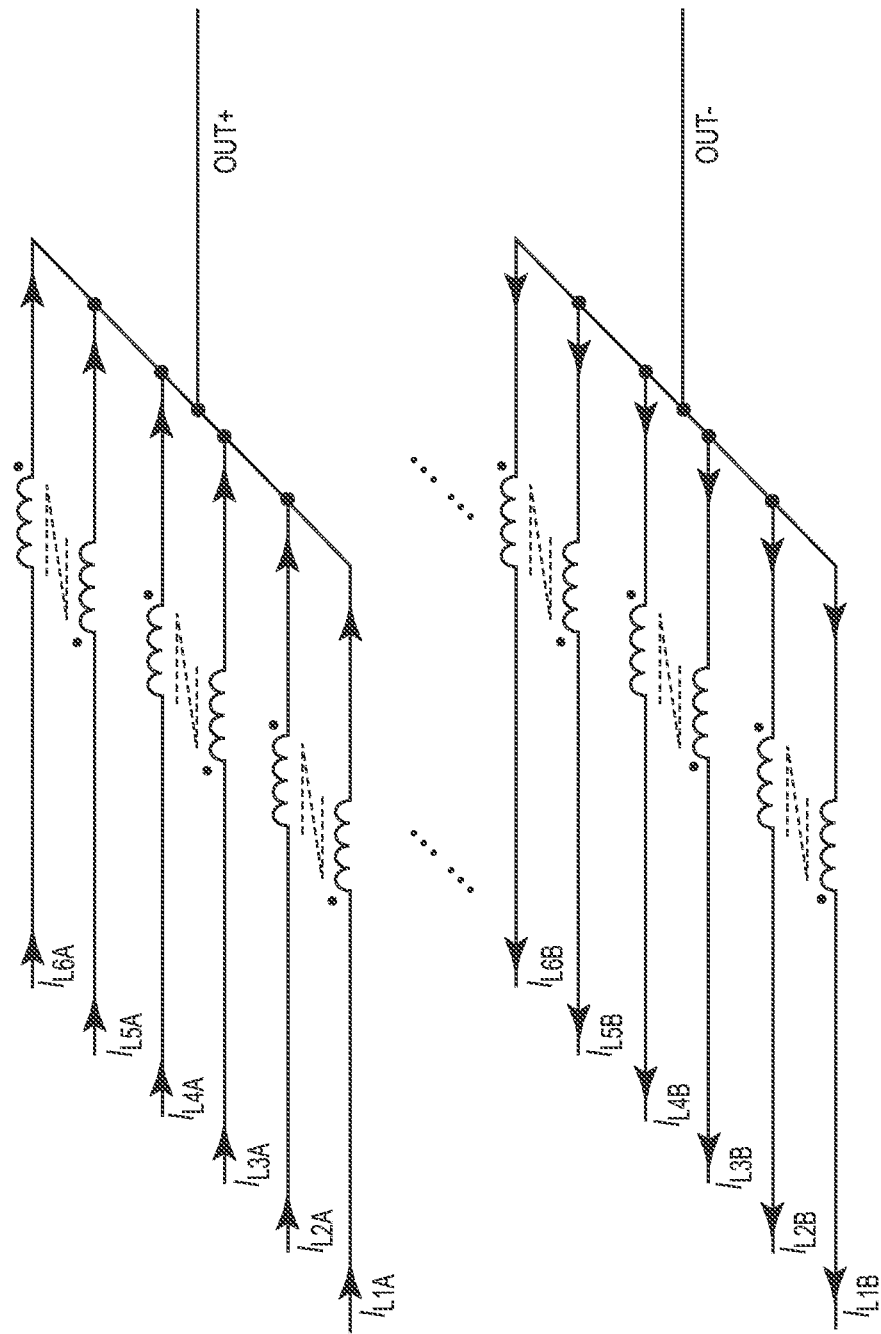
FIG. 18 illustrates inductor coupling between channels in a multi-channel converter in another embodiment for the coupled inductors.

As shown in FIG. 18, it is also possible to employ coupled inductor pairs so that the coupling is between inductors in the same phase of two channels are coupled together. In the figure, the current $i_{L \times A}$ represents the output current from the phase A and $i_{L \times B}$ represents the current returning to the phase B. There is no magnetic coupling between phase A and phase B and the coupling is only within the same phase terminals from the switch assemblies.

The polarity of the coupled inductors are also shown in FIG. 18, and indicated by the dots. Again, inverse coupling is used in this embodiment. When the current flows into the dot on one inductor being coupled, the other current should flow out from the dot on the other inductor being coupled. The coupling coefficient between the two coupled inductors can range from 0 to 1. With this arrangement, the DC flux of the core legs surrounded by the two corresponding windings can be partially canceled, resulting in the reduced cross section area of the core legs. The total size and power loss of the two coupled inductors can be reduced. The ripple flux of the two legs can be shifted by some angle with the shifted carrier angle between the one coupled channel and the other coupled channel, such that the total summed flux ripple amplitude is reduced, causing smaller core loss.

Figure 19:
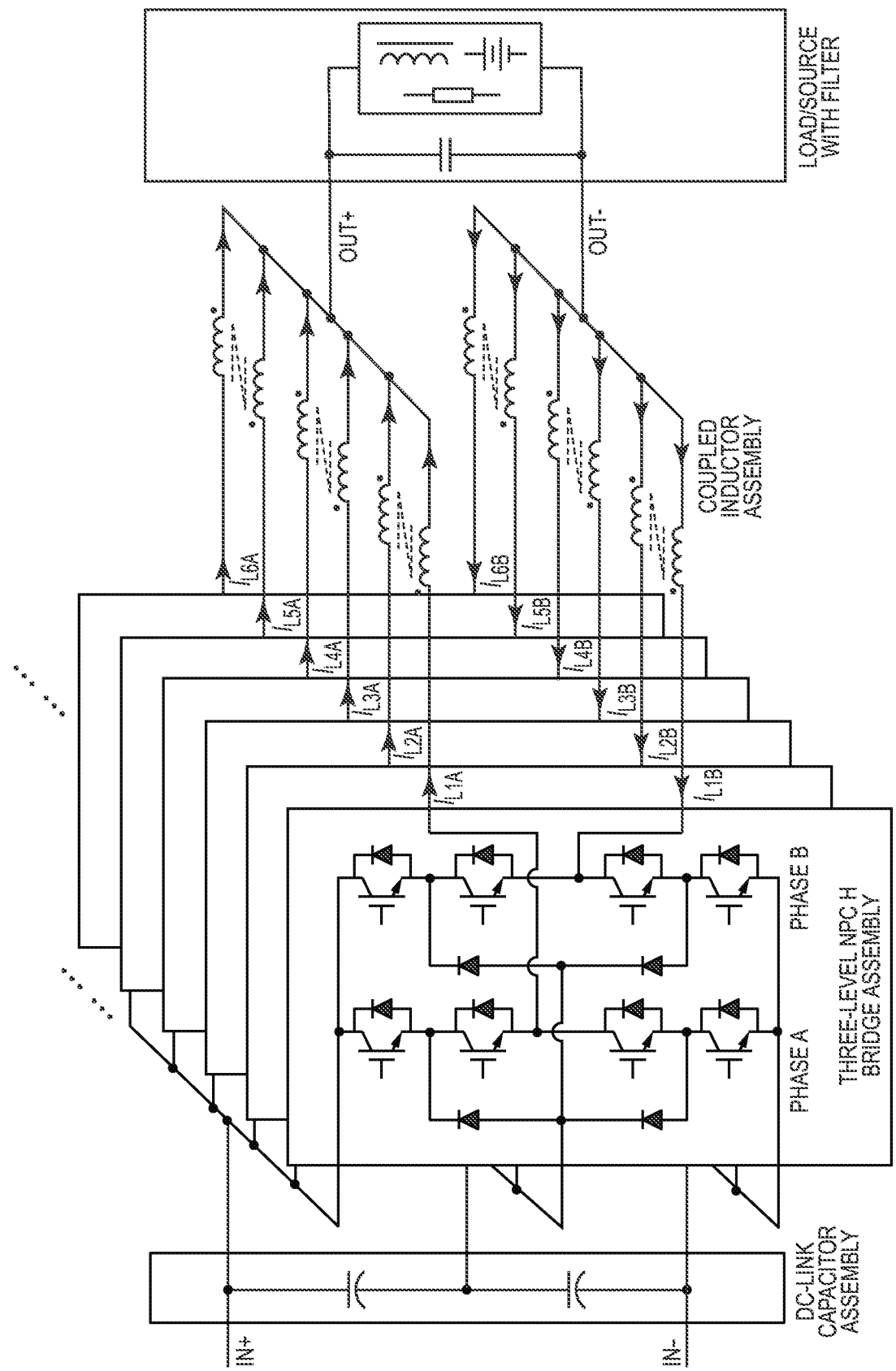
FIG. 19 shows an interleaved 3-level, four-quadrant DC-DC converter with coupled inductor pairs between channels.

The coupling arrangement shown in FIG. 18, with coupled inductor pairs between channels can be used to implement the coupled inductor assembly for an interleaved multi-channel three-level DC-DC converter, as shown in FIG. 19. In this embodiment of the converter with coupled inductors, an even number of the interleaved channels is required since one coupled inductor pair is connected to the phase A of two channels and one coupled inductor pair is connected to the phase B of two channels. Modular structure of the interleaved multi-channel multi-level converter is also possible, although each module in this case requires two channels of switch assembly and two coupled inductor pairs to make up one module.

Figure 20:
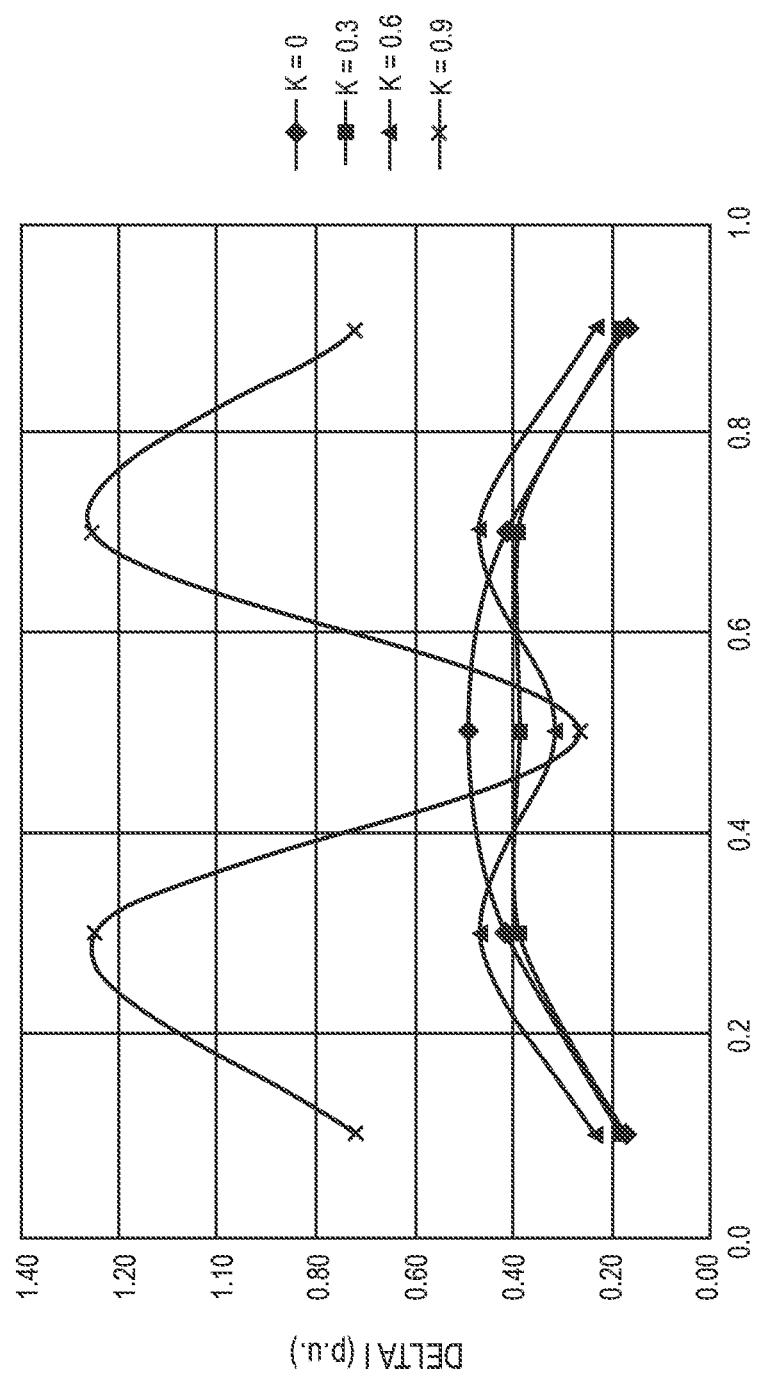
FIGS. 20 and 21 illustrate a comparison of the inductor ripple current for two coupled inductor pair arrangements.
Figure 21:
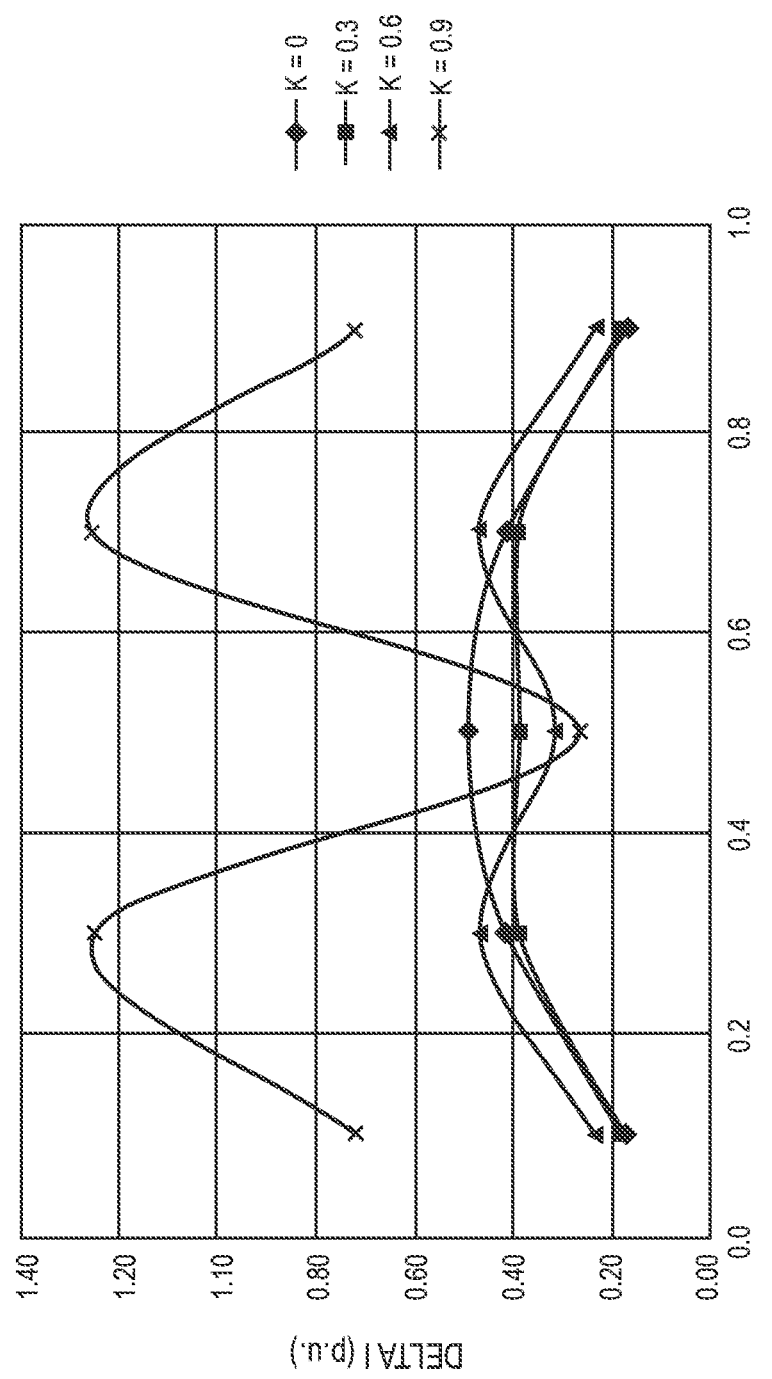

FIGS. 20 and 21 show a comparison of the inductor ripple current for two coupled inductor pair arrangements based on simulation results. FIG. 20 is the simulation result based on the interleaved, multi-channel multi-level, DC-DC converter topology shown in FIG. 19, with the coupled inductor pairs between pairs of channels, as shown in FIG. 18. FIG. 21 is the simulation result based on the interleaved, multi-channel, multi-level, DC-DC converter topology shown in FIG. 16, with the coupled inductor pairs between two phases in each channel, as shown in FIG. 15. Six channels were used in the simulation for both cases. K represents the coupling coefficient of the coupled inductor pairs, ranging from 0 to 1.

The simulation results show that similar inductor ripple current can be obtained for both arrangements. The coupling coefficient can be selected to be around 0.5, such that there is no increase of the ripple current compared to the uncoupled case (K=0) and the DC magnetic flux is canceled by 50% in the two core legs surrounded by the two windings, indicating smaller inductor size and lower loss.

Figure 22:
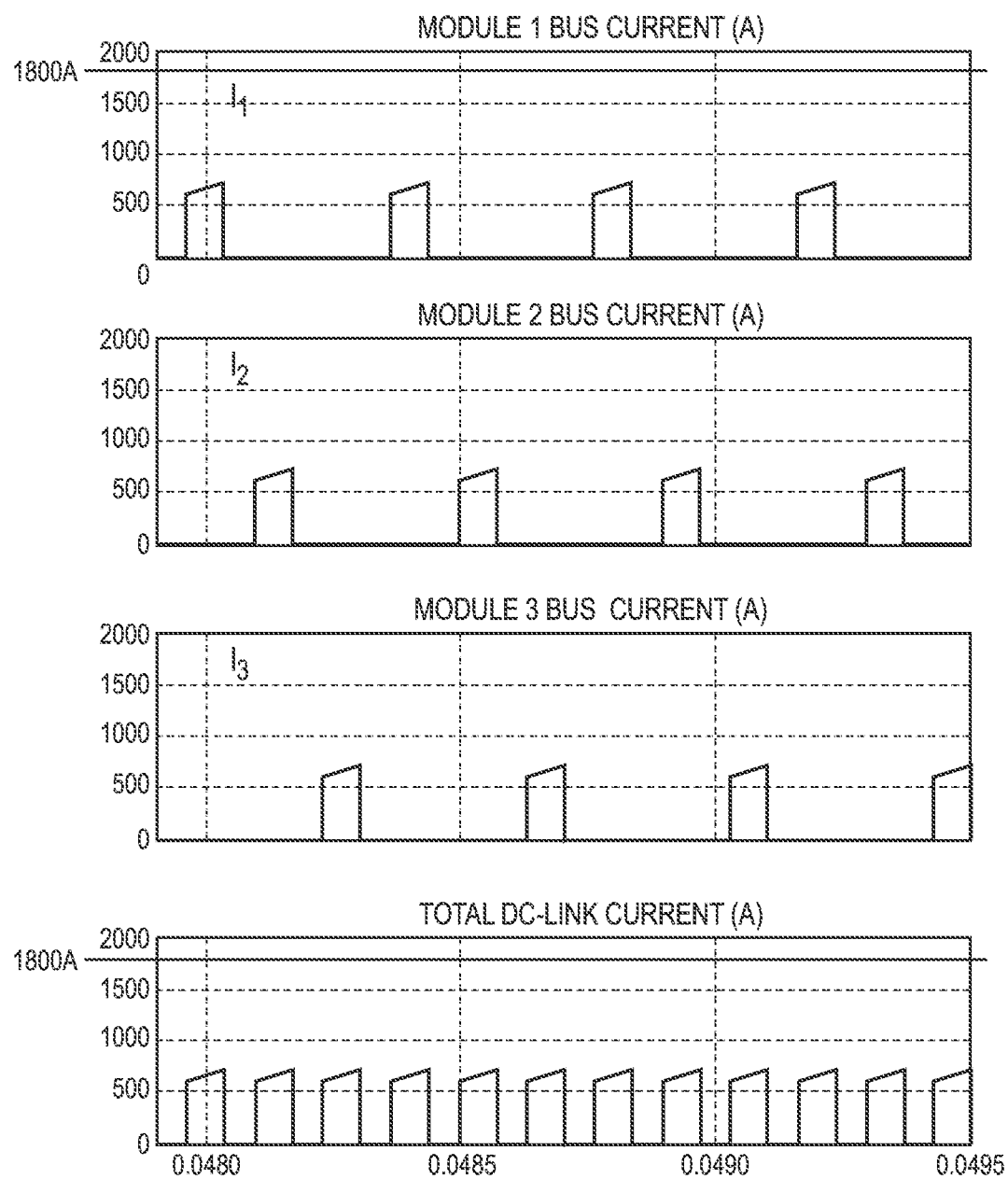
FIG. 22 illustrates an example of peak-to-peak amplitude reduction and frequency multiplication of the total channel input current corresponding to the topology shown in FIG. 16 with 3 channels, 0.2 duty cycle, and 1800 A output current, resulting in smaller input filter capacitors.

FIG. 22 illustrates the peak-to-peak amplitude reduction and frequency multiplication of the total channel input current corresponding to the topology shown in FIG. 16, with 3 channels, 0.2 duty cycle, and 1800 A output current, resulting in smaller input filter capacitors. As can be seen from the figure, the magnitude of the ripple current is reduced to $I_C/N$=for each module and the frequency of the DC-link capacitor ripple current is increased by N=3 times. Further, capacitor size is reduced by $N^2$=9 times.

Figure 23:
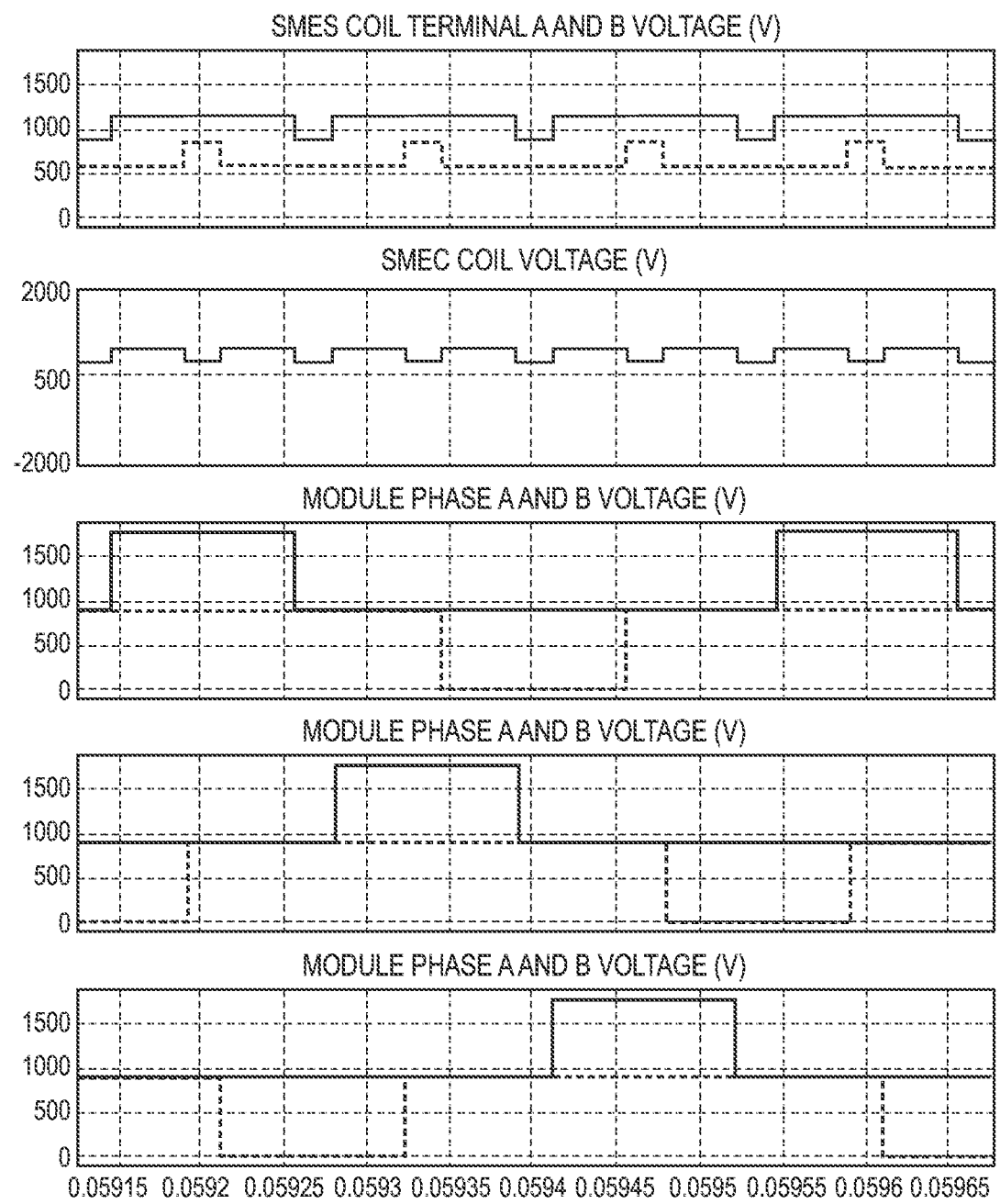
FIG. 23 illustrates an example of peak-to-peak amplitude reduction and frequency multiplication of the converter output voltage corresponding to the topology shown in FIG. 16 with a SMES coil (no filter capacitor), 3-channel modules, 0.278 duty cycle, 1800 V input and 500 V output voltage, resulting in reduced dv/dt on load or smaller output filter capacitors if needed.

FIG. 23 illustrates the peak-to-peak amplitude reduction and frequency multiplication of the converter output voltage corresponding to the topology shown in FIG. 16, with a SMES coil (no filter capacitor), 3-channel modules, 0.278 duty cycle, 1800 V input and 500 V output voltage, resulting in reduced dv/dt on load or smaller output filter capacitors if needed. In this example, due to the 3-level topology and interleaving, the magnitude of the voltage is reduced by 2N=6 times at the right-hand-side terminals. Also, the frequency of the voltage ripple at each of those same terminals is increased by N=3 times, while the frequency of the voltage ripple across the SMES coil is increased by 2N=6.

With the coupling arrangements described, interleaved, multi-channel, multi-level, DC-DC converters can be constructed by simply connecting the input of the illustrated modules to a capacitor bank and the output of the modules to the load/source. The coupled inductor pairs can be packaged together with the switch assemblies, to make up a converter channel module. The coupling of the two inductors reduces the size and loss of the magnetic components and results in a more compact and efficient DC-DC converter. The modularized design of each channel helps simplify the manufacturing process, reduce the cost, and improve the reliability of the converter.

Several inventive techniques and circuits have been disclosed above. It will be appreciated that these techniques and circuits may be combined with one another, depending on the application requirements. Thus, for example, any of the inductor coupling arrangements described above may be combined with any of the various combinations of multi-level, multi-channel, multi-quadrant, DC-DC converter circuits described herein.

With the above-described circuits, systems, methods, and other variations and extensions in mind, those skilled in the art will appreciate that the foregoing description and the accompanying drawings represent non-limiting examples of the systems and apparatus taught herein. Accordingly, the present invention is not limited by the foregoing description and accompanying drawings. Instead, the present invention is limited only by the following claims and their legal equivalents.

What is claimed is:

1. A direct-current-to-direct-current (DC-DC) power converter, comprising:
   two or more multi-quadrant, multi-level, DC-DC, switching converter subcircuits, each switching converter subcircuit including a switching assembly including a plurality of phases, the switching converter subcircuits connected in parallel at respective input and output sides, each of the respective input sides being connected to a common DC input voltage source including three or more DC voltage levels, so as to provide a multi-channel, multi-quadrant, multi-level configuration; and
   a control circuit configured to selectively control one or more switching semiconductor devices of the switching assembly in each phase of the switching converter subcircuits by transmitting one control signal of a plurality of control signals to each phase of each switching converter subcircuit,
   wherein each control signal of the plurality of control signals includes a duty cycle such that each phase of each of the switching converter subcircuit operates using the duty cycle in an interleaved manner to reduce at least one of input side ripple current and output side ripple current.

2. The DC-DC power converter of claim 1, wherein each of the switching converter subcircuits comprises a three-level, neutral-point-clamped, four-quadrant DC-DC converter circuit.

3. The DC-DC power converter of claim 1, wherein each of the switching converter subcircuits comprises a three-level, neutral-point-clamped, two-quadrant DC-DC converter circuit.

4. The DC-DC power converter of claim 1, wherein the the plurality of control signals of the switching converter subcircuits is separated by a phase angle of $2\pi/N$, where N denotes a number of the two or more multi-quadrant, multi-level, DC-DC, switching converter subcircuits.

5. The DC-DC power converter of claim 1 wherein the plurality of control signals provides interleaved operation of the two or more switching converter subcircuits connected in parallel to provide an increased effective switching frequency relative to a switching frequency applied to a single one of the switching converter subcircuits.

6. The DC-DC power converter of claim 1 wherein the plurality of control signals provides interleaved operation of the two or more switching converter subcircuits connected in parallel to effectively increase at least one of input current ripple frequency and output current ripple frequency.

7. The DC-DC power converter of claim 1, wherein each of the switching converter subcircuits comprises:
   the switching assembly having a first side and a second side, the first side having three or more terminals configured for connecting to a multi-level DC interface and the second side having a pair of terminals configured for coupling to a two-level DC interface; and
   an inductor assembly comprising first and second inductors and connected to the switching assembly so that each terminal of the pair terminals on the second side of the switching is connected to a corresponding first end of a different one of the first and second inductors.

8. The DC-DC power converter of claim 7, further comprising a filter capacitor connected across a pair of output terminals at the output sides of the switching converter subcircuits.

9. The DC-DC power converter of claim 1, wherein each of the switching converter subcircuits comprises:
   the switching assembly having a first side and a second side, the first side having three or more terminals configured for connecting to a multi-level DC interface and the second side having first and second terminals configured for coupling to a two-level DC interface; and
   first and second inductors coupled to one another, each having a first and second end, wherein the first end of the first inductor is connected to the first terminal of the switching assembly and the first end of the second inductor is connected to the second terminal of the switching assembly.

10. The DC-DC power converter of claim 9, wherein a coupling coefficient between the first and second inductors is about 0.5.

11. The DC-DC power converter of claim 9, wherein a coupling coefficient between the first and second inductors is between about 0.3 and about 0.7.

12. The DC-DC power converter of claim 9, wherein the first and second inductors are coupled to one another and to one or more additional inductors via a common core structure.

13. The DC-DC power converter of claim 9, wherein the first and second inductors comprise well-coupled windings of a transformer.

14. The DC-DC power converter of claim 9, wherein each of the switching converter subcircuits is a separate, self-contained module.

15. A direct-current-to-direct-current (DC-DC) power converter, comprising:
two or more DC-DC, switching converter subcircuits, connected in parallel at respective input and output sides; and
a control circuit configured to selectively control each of the switching converter subcircuits;
wherein each of the switching converter subcircuits comprises:
a switching assembly including a first phase and a second phase each coupled between a first side and a second side, the first phase including two semiconductor devices coupled at a first output terminal, the second phase including two semiconductor devices coupled at a second output terminal, the first side having three or more terminals configured for connecting to a first DC interface including three or more DC voltage levels providing a multi-level converter topology; and
first and second inductors magnetically coupled to one another, each having a first and second end, wherein the first end of the first inductor is connected to the first output terminal, the second end of the first inductor is connected to a positive DC bus, the first end of the second inductor is connected to the second output terminal, and the second end of the second inductor is coupled to a negative DC bus.

16. The DC-DC power converter of claim 15, wherein a coupling coefficient between the first and second inductors is about 0.5.

17. The DC-DC power converter of claim 15, wherein a coupling coefficient between the first and second inductors is between about 0.3 and about 0.7.

18. The DC-DC power converter of claim 15, wherein the first and second inductors are coupled to one another and to one or more additional inductors via a common core structure.

19. The DC-DC power converter of claim 15, wherein each of the switching converter subcircuits is a separate, self-contained module.

* * * * *